US012741561B2

(12) United States Patent
Yang et al.

(10) Patent No.: US 12,741,561 B2
(45) Date of Patent: Sep. 22, 2026

(54) DEVICE AND METHOD FOR RECOMMENDING CHARGING STATION

(71) Applicants: HYUNDAI MOTOR COMPANY, Seoul (KR); Kia Corporation, Seoul (KR); HYUNDAI AUTOEVER Corp., Seoul (KR)

(72) Inventors: Won Seok Yang, Gunpo-si (KR); Lam Lee, Seoul (KR)

(73) Assignees: HYUNDAI MOTOR COMPANY, Seoul (KR); Kia Corporation, Seoul (KR); HYUNDAI AUTOEVER CORP., Seoul (KR)

( * ) Notice: Subject to any disclaimer, the term of this patent is extended or adjusted under 35 U.S.C. 154(b) by 774 days.

(21) Appl. No.: 18/131,016

(22) Filed: Apr. 5, 2023

(65) Prior Publication Data

US 2024/0123859 A1 Apr. 18, 2024

(30) Foreign Application Priority Data

Oct. 13, 2022 (KR) ........................ 10-2022-0131748

(51) Int. Cl.
*H01M 10/44* (2006.01)
*B60L 53/66* (2019.01)
(Continued)

(52) U.S. Cl.
CPC ............. *B60L 53/68* (2019.02); *B60L 53/665* (2019.02); *B60L 58/12* (2019.02); *B60L 2240/60* (2013.01); *B60L 2240/66* (2013.01)

(58) Field of Classification Search
CPC .... B60L 53/665; B60L 58/12; B60L 2240/66; B60L 2260/52; B60L 53/60; H02J 7/0042; H02J 7/00
(Continued)

(56) References Cited

U.S. PATENT DOCUMENTS 8,232,763 B1 7/2012 Boot
9,851,213 B2 * 12/2017 Oh .......................... B60L 53/63
(Continued)

FOREIGN PATENT DOCUMENTS

CN 117893034 A * 4/2024
CN 118488098 A * 8/2024
(Continued)

*Primary Examiner* — Edward Tso
(74) *Attorney, Agent, or Firm* — MORGAN, LEWIS & BOCKIUS LLP

(57) ABSTRACT

A device includes a data collection device for collecting real-time information of a plurality of charging stations, of at least one vehicle related to the plurality of charging stations, related to external environmental factors based on a specified period, a data storage device for updating and storing the real-time information of the plurality of charging stations, of the at least one vehicle, and related to the external environmental factors based on the specified period, a data processing device for generating processing information for selecting charging stations based on the real-time information of the plurality of charging stations, of the at least one vehicle, and related to the external environmental factors, and a data application device for generating a charging station list for recommending charging stations to an ego vehicle based on at least some of the processing information generated by the data processing device.

20 Claims, 17 Drawing Sheets

(51) Int. Cl.

| | |
|---|---|
| ***B60L 53/68*** | (2019.01) |
| ***B60L 58/12*** | (2019.01) |
| ***H01M 10/46*** | (2006.01) |

(58) Field of Classification Search

USPC ......................... 320/104, 107, 109, 132, 149

See application file for complete search history.

(56) References Cited

U.S. PATENT DOCUMENTS

| | | | | |
|---|---|---|---|---|
| 10,793,018 | B2 | 10/2020 | Imai | |
| 2020/0003571 | A1 | 1/2020 | Shirakawa et al. | |
| 2020/0016993 | A1 | 1/2020 | Imai | |
| 2020/0217679 | A1* | 7/2020 | DeLuca | G01C 21/3484 |
| 2025/0296580 | A1* | 9/2025 | Sharma | B60W 50/0205 |

FOREIGN PATENT DOCUMENTS

| | | | | |
|---|---|---|---|---|
| CN | 119682681 | A | * | 3/2025 |
| CN | 121043653 | A | * | 12/2025 |
| CN | 121073077 | A | * | 12/2025 |
| CN | 121133464 | A | * | 12/2025 |
| DE | 102024001106 | A1 | * | 10/2025 |
| JP | 2019-078616 | A | | 5/2019 |
| JP | 2020-010538 | A | | 1/2020 |
| JP | 2021-009108 | A | | 1/2021 |
| KR | 10-1063656 | B1 | | 9/2011 |
| KR | 10-1716460 | B1 | | 3/2017 |
| KR | 10-2017837 | B1 | | 9/2019 |
| KR | 10-2019-0126627 | A | | 11/2019 |
| KR | 10-2304745 | B1 | | 9/2021 |
| KR | 10-2386343 | B1 | | 4/2022 |

* cited by examiner

DEVICE AND METHOD FOR RECOMMENDING CHARGING STATION

CROSS-REFERENCE TO RELATED APPLICATION

This application claims the benefit of priority to Korean Patent Application No. 10-2022-0131748, filed in the Korean Intellectual Property Office on Oct. 13, 2022, the entire contents of which are incorporated herein by reference.

TECHNICAL FIELD

The present disclosure relates to a device and a method for recommending a charging station, and more particularly, to a technology for recommending a charging station using real-time information and external environmental factors of the charging station.

BACKGROUND

Recently, interest in electric vehicles and hybrid vehicles has increased so as to reduce carbon emission.

The electric vehicle (EV) refers to a vehicle using a battery and a motor without using petroleum fuel and an engine. Such an electric vehicle may be operated using electric energy charged in the battery as the battery installed therein is charged by a general charging system in a parked state.

In addition, interest in a hydrogen fuel cell vehicle (HFCV) or a fuel cell vehicle (FCV) is also increasing. The hydrogen fuel cell vehicle is a vehicle that uses a principle of generating electricity via an electrochemical reaction between hydrogen charged in a hydrogen storage tank and oxygen in the air, and using the generated electricity to run the motor to generate power.

When it is necessary to charge the battery or the hydrogen storage tank for operation of the electric vehicle or the hydrogen fuel cell vehicle, the electric vehicle (hereinafter, description will be made using the 'electric vehicle' for convenience of description) may provide a charging station recommendation service using a current state of charge (SoC) and/or information on an adjacent charging station.

However, because of not considering external factors (e.g., an outside air temperature, an outside air speed, and/or a weather) affecting a charging time of the battery when providing the charging station recommendation service, a time it takes to reach a final destination may increase depending on a weather change.

SUMMARY

The present disclosure has been made to solve the above-mentioned problems occurring in the prior art while advantages achieved by the prior art are maintained intact.

An aspect of the present disclosure provides a device and a method for recommending a charging station that provide a more appropriate and accurate charging station recommendation service to a driver by further utilizing external environmental factors that affect a battery or a hydrogen storage tank.

Another aspect of the present disclosure provides a device and a method for recommending a charging station that improve convenience of charging of an electric vehicle or a hydrogen fuel cell vehicle by selectively selecting an indoor or outdoor charging station based on external environmental factors and recommending the selected charging station.

Another aspect of the present disclosure provides a device and a method for recommending a charging station that minimize an influence of external environmental factors affecting a battery or a hydrogen storage tank on the battery or the hydrogen storage tank, and allow an efficiency of charging and use of the battery or the hydrogen storage tank to be consistently maintained.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for recommending a charging station includes a data collection device for collecting real-time information of a plurality of charging stations, real-time information of at least one vehicle related to the plurality of charging stations, and real-time information related to external environmental factors based on a specified period, a data storage device for updating and storing the real-time information of the plurality of charging stations, the real-time information of the at least one vehicle, and the real-time information related to the external environmental factors based on the specified period, a data processing device for generating processing information for selecting some of the plurality of charging stations based on the real-time information of the plurality of charging stations, the real-time information of the at least one vehicle, and the real-time information related to the external environmental factors, and a data application device for generating a charging station list for recommending charging stations among the plurality of charging stations to an ego vehicle based on at least some of the processing information generated by the data processing device.

In one embodiment, the data processing device may identify an outside air temperature of a region including a travel route of the ego vehicle of the real-time information related to the external environmental factors, and classify the region into a plurality of temperature regions including a first temperature region, a second temperature region, and a third temperature region based on the outside air temperature. For example, the first temperature region may include a region where the outside air temperature is equal to or higher than a first temperature, the second temperature region may include a region where the outside air temperature is lower than the first temperature and equal to or higher than a second temperature lower than the first temperature, and the third temperature region may include a region where the outside air temperature is lower than the second temperature.

In one embodiment, the data processing device may identify at least one charging station included in the third temperature region among the plurality of charging stations, identify a charging station of an indoor type among the at least one charging station based on the real-time information of the plurality of charging stations, and generate the processing information including the identified charging station of the indoor type.

In one embodiment, the data processing device may identify an outside air speed of the region including the travel route of the ego vehicle of the real-time information related to the external environmental factors, and classify the region into a plurality of wind speed regions including a first wind speed region, a second wind speed region, and a third wind speed region based on the outside air speed. For example, the first wind speed region may include a region where the outside air speed is lower than a first speed, the second wind speed region may include a region where the outside air speed may be equal to or higher than the first speed and lower than a second speed higher than the first speed, and the third wind speed region may include a region where the outside air speed is equal to or higher than the second speed.

In one embodiment, the data processing device may identify at least one second charging station included in the first wind speed region and the third temperature region among the plurality of charging stations, identify at least one third charging station included in the second wind speed region and the second temperature region among the plurality of charging stations, identify at least one first charging station included in the third wind speed region among the plurality of charging stations, identify a charging station of an indoor type among the at least one first charging station, the at least one second charging station, and the at least one third charging station based on the real-time information of the plurality of charging stations, and generate the processing information including the identified charging station of the indoor type.

In one embodiment, the data processing device may identify remaining charging stations other than the at least one first charging station, the at least one second charging station, and the at least one third charging station among the plurality of charging stations, identify at least one fourth charging station among the remaining charging stations based on at least one of a charging station preference of a driver, a charging fee, a parking fee, the real-time information of the plurality of charging stations, or any combination of the same, and generate the processing information further including the at least one fourth charging station.

In one embodiment, the data processing device may classify the plurality of charging stations into charging stations of a first group and charging stations of a second group based on a weather near the charging station and a charging station installation type included in the real-time information of the plurality of charging stations, generate recommendation information for assigning a higher weight to the charging stations of the first group than to the charging stations of the second group, and generate the processing information for generating the charging station list further based on the recommendation information.

In one embodiment, the data processing device may classify charging stations with the weather near the charging station corresponding to a first weather including snow, rain, hail, and typhoon and with the charging station installation type being an outdoor type as the charging stations of the second group among the plurality of charging stations, and classify remaining charging stations not classified as the charging stations of the second group as the charging stations of the first group among the plurality of charging stations.

In one embodiment, the data application device may determine, when a destination of the ego vehicle is set, whether the destination is reachable based on data of the ego vehicle and the real-time information related to the external environmental factors, and provide the charging station list including at least one optimal charging station to the ego vehicle upon determining that the destination is not reachable. For example, the data of the ego vehicle may include at least one of location information of the ego vehicle, a state of charge (SoC) of a battery, a distance to empty (DTE), a state of charge of a hydrogen storage tank, an estimated distance for the hydrogen storage tank to empty, or any combination of the same.

In one embodiment, the data processing device may calculate expected congestion levels of the plurality of charging stations using the real-time information of the plurality of charging stations and the real-time information of the at least one vehicle related to the plurality of charging stations, and generate the processing information further based on the expected congestion levels. For example, the real-time information of the plurality of charging stations may include at least one of location information, a type of a charger, nearby amenity information, charging fee information, operating hours, information on a vehicle being charged, information on a vehicle scheduled to be charged, daily average charging time information, or any combination of the same, and the real-time information of the at least one vehicle may include at least one of an estimated time of arrival to a charging station, an expected charging end time, an expected time required for charging, or any combination of the same.

According to another aspect of the present disclosure, a method for recommending a charging station includes collecting, by a data collection device, real-time information of a plurality of charging stations, real-time information of at least one vehicle related to the plurality of charging stations, and real-time information related to external environmental factors based on a specified period, updating and storing, by a data storage device, the real-time information of the plurality of charging stations, the real-time information of the at least one vehicle, and the real-time information related to the external environmental factors based on the specified period, generating, by a data processing device, processing information for selecting some of the plurality of charging stations based on the real-time information of the plurality of charging stations, the real-time information of the at least one vehicle, and the real-time information related to the external environmental factors, and generating, by a data application device, a charging station list for recommending charging stations among the plurality of charging stations to an ego vehicle based on at least some of the processing information generated by the data processing device.

In one embodiment, the generating, by the data processing device, of the processing information may include identifying, by the data processing device, an outside air temperature of a region including a travel route of the ego vehicle of the real-time information related to the external environmental factors, and classifying, by the data processing device, the region into a plurality of temperature regions including a first temperature region, a second temperature region, and a third temperature region based on the outside air temperature. For example, the first temperature region may include a region where the outside air temperature is equal to or higher than a first temperature, the second temperature region may include a region where the outside air temperature is lower than the first temperature and equal to or higher than a second temperature lower than the first temperature, and the third temperature region may include a region where the outside air temperature is lower than the second temperature.

In one embodiment, the generating, by the data processing device, of the processing information may include identifying, by the data processing device, at least one charging station included in the third temperature region among the plurality of charging stations, identifying, by the data processing device, a charging station of an indoor type among the at least one charging station based on the real-time information of the plurality of charging stations, and generating, by the data processing device, the processing information including the identified charging station of the indoor type.

In one embodiment, the generating, by the data processing device, of the processing information may include identifying, by the data processing device, an outside air speed of the region including the travel route of the ego vehicle of the real-time information related to the external environmental factors, and classifying, by the data processing device, the region into a plurality of wind speed regions including a first wind speed region, a second wind speed region, and a third wind speed region based on the outside air speed. The first wind speed region may include a region where the outside air speed is lower than a first speed, the second wind speed region may include a region where the outside air speed is equal to or higher than the first speed and lower than a second speed higher than the first speed, and the third wind speed region may include a region where the outside air speed is equal to or higher than the second speed.

In one embodiment, the generating, by the data processing device, of the processing information may include identifying, by the data processing device, at least one second charging station included in the first wind speed region and the third temperature region among the plurality of charging stations, identifying, by the data processing device, at least one third charging station included in the second wind speed region and the second temperature region among the plurality of charging stations, identifying, by the data processing device, at least one first charging station included in the third wind speed region among the plurality of charging stations, identifying, by the data processing device, a charging station of an indoor type among the at least one first charging station, the at least one second charging station, and the at least one third charging station based on the real-time information of the plurality of charging stations, and generating, by the data processing device, the processing information including the identified charging station of the indoor type.

In one embodiment, the generating, by the data processing device, of the processing information may include identifying, by the data processing device, remaining charging stations other than the at least one first charging station, the at least one second charging station, and the at least one third charging station among the plurality of charging stations, identifying, by the data processing device, at least one fourth charging station among the remaining charging stations based on at least one of a charging station preference of a driver, a charging fee, a parking fee, the real-time information of the plurality of charging stations, or any combination of the same, and generating, by the data processing device, the processing information further including the at least one fourth charging station.

In one embodiment, the generating, by the data processing device, of the processing information may include classifying, by the data processing device, the plurality of charging stations into charging stations of a first group and charging stations of a second group based on a weather near the charging station and a charging station installation type included in the real-time information of the plurality of charging stations, generating, by the data processing device, recommendation information for assigning a higher weight to the charging stations of the first group than to the charging stations of the second group, and generating, by the data processing device, the processing information for generating the charging station list further based on the recommendation information.

In one embodiment, the generating, by the data processing device, of the processing information may include classifying, by the data processing device, charging stations with the weather near the charging station corresponding to a first weather including snow, rain, hail, and typhoon and with the charging station installation type being an outdoor type as the charging stations of the second group among the plurality of charging stations, and classifying, by the data processing device, remaining charging stations not classified as the charging stations of the second group as the charging stations of the first group among the plurality of charging stations.

In one embodiment, the generating, by the data application device, of the charging station list may include determining, by the data application device, when a destination of the ego vehicle is set, whether the destination is reachable based on data of the ego vehicle and the real-time information related to the external environmental factors, and providing, by the data application device, the charging station list including at least one optimal charging station to the ego vehicle upon determining that the destination is not reachable. For example, the data of the ego vehicle may include at least one of location information of the ego vehicle, a state of charge (SoC) of a battery, a distance to empty (DTE), a state of charge of a hydrogen storage tank, an estimated distance for the hydrogen storage tank to empty, or any combination of the same.

In one embodiment, the generating, by the data processing device, of the processing information may include calculating, by the data processing device, expected congestion levels of the plurality of charging stations using the real-time information of the plurality of charging stations and the real-time information of the at least one vehicle related to the plurality of charging stations, and generating, by the data processing device, the processing information further based on the expected congestion levels. The real-time information of the plurality of charging stations may include at least one of location information, a type of a charger, nearby amenity information, charging fee information, operating hours, information on a vehicle being charged, information on a vehicle scheduled to be charged, daily average charging time information, or any combination of the same, and the real-time information of the at least one vehicle may include at least one of an estimated time of arrival to a charging station, an expected charging end time, an expected time required for charging, or any combination of the same.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
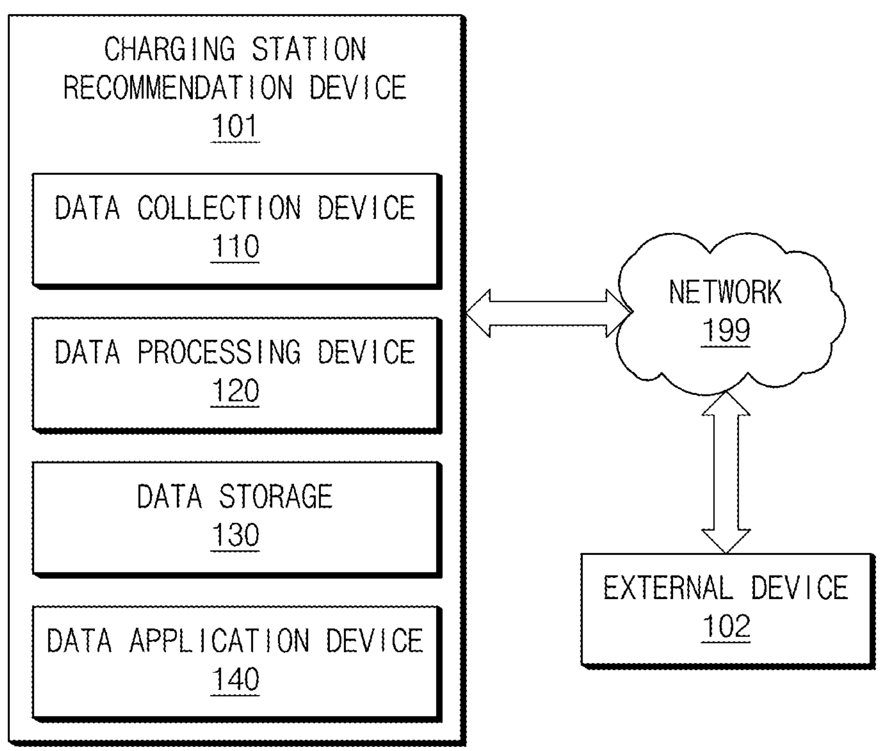
FIG. 1 is a block diagram showing a configuration of a charging station recommendation device and an external device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to classify the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 17.

FIG. 1 is a block diagram showing a configuration of a charging station recommendation device 101 and an external device 102 according to an embodiment of the present disclosure.

Referring to FIG. 1, the charging station recommendation device 101 according to an embodiment of the present disclosure may be implemented inside a vehicle. In this regard, the charging station recommendation device 101 may be integrally formed with internal control units of the vehicle, or may be implemented as a separate device and connected to the control units of the vehicle by separate connection means.

According to one embodiment, the charging station recommendation device 101 may include a data collection device 110, a data processing device 120, a data storage device 130, and a data application device 140. In various embodiments, the charging station recommendation device 101 may include additional components in addition to the components illustrated in FIG. 1, or may omit at least one of the components illustrated in FIG. 1.

According to one embodiment, the data collection device 110, the data processing device 120, the data storage device 130, and the data application device 140 may be controlled by at least one processor (not shown) included in the charging station recommendation device 101.

According to one embodiment, the processor (e.g., computer, microprocessor, CPU, ASIC, circuitry, logic circuits, etc.) may have an associated non-transitory memory storing software instructions which, when executed by the processor, provides the functionalities of the data collection device 110, the data processing device 120, the data storage device 130, and the data application device 140. The processor may electrically control each component of the charging station recommendation device 101 and/or process signals transmitted between components thereof, and may be an electric circuit that executes instructions of software, thereby performing various data processing and calculations to be described later. The processor may take the form of one or more processor(s) and associated memory storing program instructions which provide the functionalities of the above devices 110, 120, 130 and 140.

According to one embodiment, the external device 102 may be a device that transmits and receives data with the charging station recommendation device 101 via a network 199. For example, the external device 102 may be a vehicle. As an example, the external device 102 may be an external vehicle different from an ego vehicle in which the charging station recommendation device 101 generates and provides a charging station list.

According to one embodiment, the charging station recommendation device 101 may transmit and receive the data with the external device 102 via the network 199. For example, the charging station recommendation device 101 may receive real-time information from the external device 102. As an example, the charging station recommendation device 101 may receive one of location information of the external device 102, an estimated time of arrival to a charging station, an expected charging end time, an expected time required for charging, or a combination thereof from the external device 102.

According to one embodiment, the data collection device 110 may collect various information for the generation of the charging station list for recommending charging stations to the ego vehicle, based on a specified period.

For example, the data collection device 110 may collect real-time information of a plurality of charging stations based on the specified period. As an example, the real-time information of the plurality of charging stations may include at least one of the location information of the charging station, nearby amenity information, charging fee information, operating hours, information on a vehicle being charged, information on a vehicle scheduled to be charged, daily average charging time information, a weather near the charging station, a charging station type, a charging fee, a parking fee, whether a charger is charging a vehicle, whether the charger is available, a type (e.g., an ultrahigh speed type, a high speed type, or a low speed type) of the charger, whether the charger is broken, or any combination thereof. For example, the data collection device 110 may collect the information as described above based on the specified period by performing communication based on the network 199 with the charging stations.

For example, the data collection device 110 may collect real-time information of at least one vehicle related to the plurality of charging stations based on the specified period. As an example, the real-time information of the at least one vehicle may include at least one of an estimated time of arrival to the charging station, an expected charging end time, an expected time required for charging, a state of charge (SoC) of a battery, an estimated time to run out of the battery, a battery charging scheme, a state of charge of a hydrogen storage tank, an estimated time for the hydrogen storage tank to empty, a hydrogen storage tank charging scheme, current travel destination information or a current travel route, or any combination thereof. For example, the data collection device 110 may collect the information as described above based on the specified period by performing communication based on the network 199 with the external device 102 related to the charging station. For example, the data collection device 110 may receive the information of the at least one vehicle in real time immediately after the at least one vehicle in at least one charging station is connected to the charger.

For example, the data collection device 110 may collect real-time information related to external environmental factors based on the specified period. For example, the real-time information related to the external environmental factors may include at least one of an outside air temperature, an outside air speed, a weather, or any combination thereof. As an example, the data collection device 110 may collect information on an outside air temperature, an outside air speed, and/or a weather of a region including a travel route of the ego vehicle based on the specified period.

For example, the data collection device 110 may collect information related to the ego vehicle (e.g., data of the ego vehicle) based on the specified period. For example, the data of the ego vehicle may include at least one of location information of the ego vehicle, a charging station preference of a driver, a state of charge (SoC) of the battery, a distance to empty (DTE), a state of charge of the hydrogen storage tank, an estimated distance for the hydrogen storage tank to empty, or any combination thereof.

According to one embodiment, the data processing device 120 may generate processing information for selecting some of the plurality of charging stations based on the real-time information of the plurality of charging stations, the real-time information of the at least one vehicle, and/or the real-time information related to the external environmental factors. For example, the processing information generated by the data processing device 120 may be information for generating the charging station list for recommending the charging stations among the plurality of charging stations to the driver of the ego vehicle.

For example, the data processing device 120 may identify the outside air temperature of the region including the travel route of the ego vehicle of the real-time information related to the external environmental factors, and identify the region including the travel route by classifying the same into a plurality of temperature regions based on a range of the outside air temperature. For example, the data processing device 120 may classify the region including the travel route into the plurality of temperature regions including a first temperature region, a second temperature region, and a third temperature region based on the outside air temperature.

For example, the first temperature region may include a region in which the outside air temperature is equal to or higher than the first temperature, the second temperature region may include a region in which the outside air temperature is lower than the first temperature and equal to or higher than a second temperature, and the third temperature region may include a region in which the outside air temperature is lower than the second temperature. For example, the second temperature may include a temperature lower than the first temperature.

For example, the data processing device 120 may identify a charging station of an indoor type from charging stations included in a low temperature region. As an example, the data processing device 120 may identify at least one charging station included in the third temperature region among the plurality of charging stations, and identify the charging station of the indoor type among the at least one charging station based on the real-time information of the plurality of charging stations. The data processing device 120 may allow the identified charging station of the indoor type to be included in the processing information. In other words, the data processing device 120 may generate the processing information such that only a charging station of the indoor type is recommended to the ego vehicle among charging stations installed in a region in which the temperature is lower than a specified temperature (e.g., the second temperature).

For example, the data processing device 120 may identify the outside air speed of the region including the travel route of the ego vehicle of the real-time information related to the external environmental factors, and identify the region including the travel route by classifying the same into a plurality of wind speed regions including a first wind speed region, a second wind speed region, and a third wind speed region based on the outside air speed.

As an example, the first wind speed region may include a region in which the outside air speed is lower than a first speed, the second wind speed region may include a region in which the outside air speed is equal to or higher than the first speed and lower than a second speed, and the third wind speed region may include a region in which the outside air speed is equal to or higher than the second speed. For example, the second speed may include a speed higher than the first speed.

For example, the data processing device 120 may identify a charging station of the indoor type among charging stations included in a high wind speed region. As an example, the data processing device 120 may identify at least one first charging station included in the first wind speed region among the plurality of charging stations, and identify the charging station of the indoor type among the at least one first charging station based on the real-time information of the plurality of charging stations. The data processing device 120 may allow the identified charging station of the indoor type to be included in the processing information. In other words, the data processing device 120 may generate the processing information such that only the charging station of the indoor type is recommended to the ego vehicle among charging stations installed in a region in which the wind speed is equal to or higher than a specified speed (e.g., the second speed).

For example, the data processing device 120 may generate the processing information in consideration of the outside air temperature and the outside air speed. As an example, the data processing device 120 may identify at least one second charging station included in the first wind speed region and the third temperature region among the plurality of charging stations, identify at least one third charging station included in the second wind speed region and the second temperature region among the plurality of charging stations, and identify a charging station of the indoor type among the at least one second charging station and the at least one third charging station. The data processing device 120 may allow the identified charging station of the indoor type to be included in the processing information. In other words, when a specific region satisfies both a specified range of the outside air speed and a specified range of the outside air temperature, the data processing device 120 may generate the processing information such that only a charging station of the indoor type among charging stations installed in the specific region is recommended to the ego vehicle.

For example, the data processing device 120 may generate the processing information based on at least one of the charging station preference of the driver, the charging fee, the parking fee, the real-time information of the plurality of charging stations, or any combination thereof. As an example, the data processing device 120 may identify the remaining charging stations except for the at least one first charging station, the at least one second charging station, and the at least one third charging station identified by the above-described embodiment among the plurality of charging stations, and identify at least one fourth charging station among the remaining charging stations based on at least one of the charging station preference of the driver, the charging fee, the parking fee, the real-time information of the plurality of charging stations, or any combination thereof. The data processing device 120 may allow the identified at least one fourth charging station to be included in the processing information. In other words, the data processing device 120 may identify charging stations (e.g., the at least one fourth charging station) that do not require conditions of indoor and outdoor types based on criteria including the outside air temperature and the outside air speed, and generate the processing information further using the above conditions such that an optimal charging station is recommended to the ego vehicle.

For example, the data processing device 120 may generate the processing information based on the real-time information of the plurality of charging stations. For example, the data processing device 120 may classify the plurality of charging stations into charging stations of a first group and charging stations of a second group based on the weather near the charging station and the charging station installation type included in the real-time information of the plurality of charging stations. The charging stations of the second group may include charging stations with the weather near the charging stations corresponding to a first weather including snow, rain, hail, and typhoon and with the charging station installation type of the outdoor type. The charging stations of the first group may include the remaining charging stations that are not classified as the charging stations of the second group. The data processing device 120 may generate recommendation information that gives a higher weight to the charging stations of the first group than that of the charging stations of the second group, and generate the processing information for generating the charging station list further based on the recommendation information. In other words, the data processing device 120 may generate the processing information that gives a relatively low weight to charging stations (e.g., the charging stations of the second group) with the weather near the charging stations difficult to perform outdoor charging.

For example, the data processing device 120 may generate the processing information based on expected congestion levels of the plurality of charging stations.

As an example, the data processing device 120 may calculate the expected congestion levels of the plurality of charging stations using the real-time information of the plurality of charging stations and the real-time information of the at least one vehicle related to the plurality of charging stations. The data processing device 120 may generate the processing information based on the calculated expected congestion levels.

The real-time information of the plurality of charging stations may include, for example, at least one of the location information, the type of the charger, the nearby amenity information, the charging fee information, the operating hours, the information on the vehicle being charged, the information on the vehicle scheduled to be charged, the daily average charging time information, or any combination thereof.

The real-time information of the at least one vehicle may include, for example, at least one of the estimated time of arrival to the charging station, the expected charging end time, the expected time required for the charging, or any combination thereof.

According to one embodiment, the data storage device 130 may store and update various data associated with the charging station recommendation device 101, the external device 102, and/or the charging station.

For example, the data storage device 130 may update and store the real-time information of the plurality of charging stations, the real-time information of the at least one vehicle, and the real-time information related to the external environmental factors based on a specified period.

According to one embodiment, the data application device 140 may generate the charging station list for recommending the charging stations among the plurality of charging stations to the ego vehicle based on at least some of the processing information generated by the data processing device 120.

For example, the data application device 140 may recommend at least one charging station with priority set based on the at least some of the processing information to the ego vehicle.

As an example, when at least one vehicle is being charged at a specific charging station included in the processing information, the data application device 140 may identify a difference between an expected charging end time of the at least one vehicle and the estimated time of arrival to the charging station of the ego vehicle. The data application device 140 may recommend the charging station as a first-priority charging station when the difference is equal to or smaller than a specified time (e.g., 5 minutes).

As an example, when the at least one vehicle is a vehicle traveling to the specific charging station included in the processing information, the data application device 140 may identify a difference between the expected charging end time of the at least one vehicle including an estimated time of arrival to the charging station of the at least one vehicle and an estimated time of arrival to the at least one charging station of the ego vehicle. The data application device 140 may recommend the charging station as a second-priority charging station when the difference is equal to or smaller than a specified time (e.g., 10 minutes).

As an example, the data application device 140 may determine a charging station for which the estimated time of arrival of the ego vehicle is smaller than or equal to a threshold time among the charging stations included in the charging station list as a primary candidate charging station. The data application device 140 may select at least one charging station to be determined as the primary candidate charging station among the plurality of charging stations every specified time. The data application device 140 may assign a specific value to each of the at least one charging station determined as the primary candidate charging station based on at least one of the charging station preference of the driver, a charger type preference of the driver, a distance to a final destination or a distance to a stopover. The data application device 140 may assign the specific value based on the distance to the final destination or the distance to the stopover or based on whether to stop at a service area in case of a long distance. The data application device 140 may recommend the optimal charging station to the ego vehicle based on the specific value assigned to each of the at least one charging station determined as the primary candidate charging station. The data application device 140 may recommend a charging station having the highest assigned value among the at least one charging station determined as the primary candidate charging station to the ego vehicle.

As an example, the data application device 140 may provide the generated charging station list to the ego vehicle based on a specified condition being satisfied. When the destination of the ego vehicle is set, the data application device 140 may determine whether it is possible to reach the destination based on the data of the ego vehicle and the real-time information related to the external environmental factors, and, upon determining that it is not possible to reach the destination, provide a charging station list including at least one optimal charging station to the ego vehicle.

For example, the data of the ego vehicle may include at least one of the location information of the ego vehicle, the state of charge of the battery, the distance to empty, or any combination thereof. The data of the ego vehicle may be data collected by the data collection device 110 based on the specified period.

According to various embodiments, the ego vehicle and/or the external device 102 may include a hydrogen fuel cell vehicle, an electric vehicle, a plug-in hybrid electric vehicle (PHEV), and the like. However, the present disclosure may not be limited thereto, and the ego vehicle and/or the external device 102 may include vehicles with various charging types.

Hereinafter, the present disclosure will be specifically described focusing on the electric vehicle for convenience of description. However, such description does not mean that the present disclosure is limited to the electric vehicle only. It is clear that the present disclosure is applied to all of the electric vehicle and the plug-in hybrid electric vehicle that require the battery charging, and the hydrogen fuel cell vehicle that requires the hydrogen storage tank charging.

Figure 2:
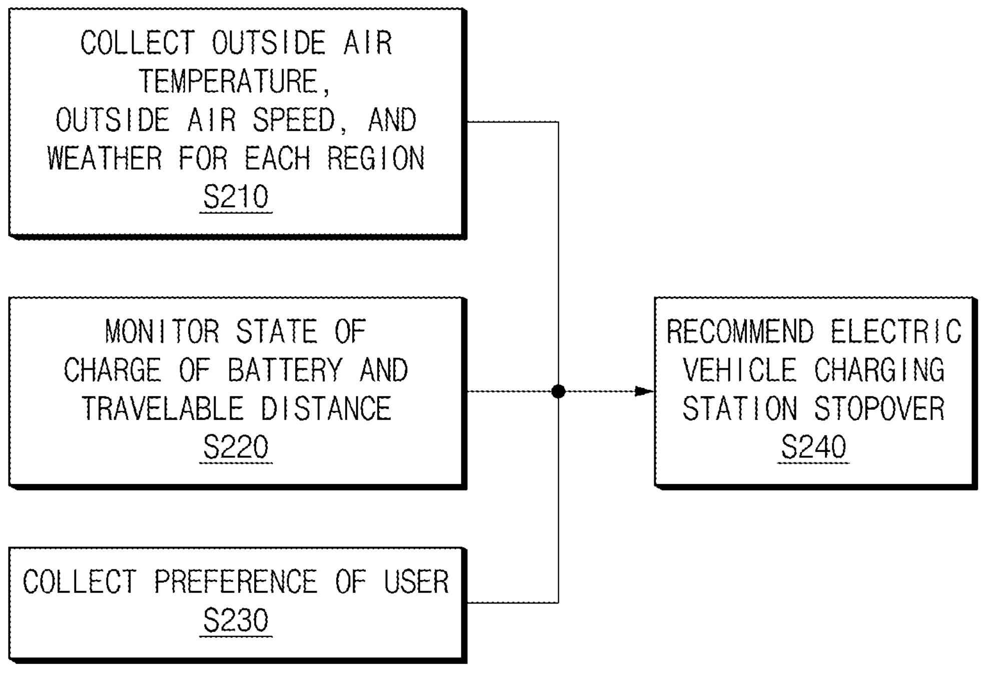
FIG. 2 is a conceptual diagram illustrating operations of a charging station recommendation device according to an embodiment of the present disclosure.

FIG. 2 is a conceptual diagram illustrating operations of a charging station recommendation device according to an embodiment of the present disclosure. In relation to the contents of FIG. 2, contents corresponding to or duplicated with the above contents may be briefly described or omitted.

In a following embodiment, steps (or operations) of S210 to S240 may be performed by the at least one processor that is electrically connected the data collection device, the data processing device, the data storage device, and the data application device included in a charging station recommendation device (e.g., the charging station recommendation device 101 in FIG. 1).

According to one embodiment, in the device and the method for recommending the charging station, the processor may collect the outside air temperature, the outside air speed, and a weather for each region (S210).

For example, the processor may classify the plurality of charging stations into at least one group using the collected data. As an example, the processor may classify the region including the travel route of the ego vehicle into a plurality of regions based on the range of the outside air temperature, and identify charging stations included in the classified plurality of regions. As an example, the processor may classify the region including the travel route of the ego vehicle into a plurality of regions based on a range of the outside air speed, and identify charging stations included in the classified plurality of regions. As an example, a weather near the plurality of charging stations may be identified, and whether the identified weather is included in one of the first weather and a second weather may be identified.

According to one embodiment, in the device and the method for recommending the charging station, the processor may monitor the state of charge of the battery and a travelable distance (S220).

For example, the processor may identify the battery state of charge of the ego vehicle, and identify the travelable distance of the ego vehicle based on the identified state. As an example, the processor may further use the data identified in S210 to identify the travelable distance of the ego vehicle. Because the battery is affected by the outside air temperature, the outside air speed, and/or the weather, the travelable distance of the ego vehicle may be identified by further considering the influence.

According to one embodiment, in the device and the method for recommending the charging station, the processor may collect a preference of a user (or the driver) (S230).

For example, the processor may collect information related to the user of the ego vehicle. For example, the processor may collect at least one of a charging station preference of the user, a charger type preference of the user, a charging fee preference of the user, a nearby convenience facility preference, or any combination thereof.

According to one embodiment, in the device and the method for recommending the charging station, the processor may recommend an electric vehicle charging station stopover (S240).

For example, the processor may generate a charging station list for recommending charging stations to the user based on the collected information, and recommend a stopover for the ego vehicle to pass through the optimal charging station while traveling to the destination based on location information of the charging stations included in the charging station list.

Figure 3:
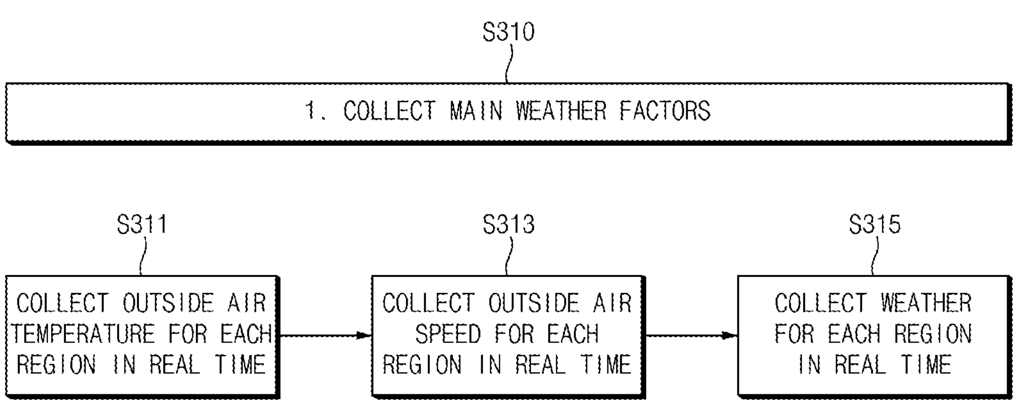
FIG. 3 is a conceptual diagram illustrating operations of a charging station recommendation device according to an embodiment of the present disclosure.

FIG. 3 is a conceptual diagram illustrating operations of a charging station recommendation device according to an embodiment of the present disclosure. In relation to the contents of FIG. 3, contents corresponding to or duplicated with the above contents may be briefly described or omitted.

In a following embodiment, step (or operation) of S310 may be performed by the at least one processor that is electrically connected the data collection device, the data processing device, the data storage device, and the data application device included in a charging station recommendation device (e.g., the charging station recommendation device 101 in FIG. 1). In addition, in a following embodiment, operations S311 to S315 may be performed by the at least one processor in step S310.

According to one embodiment, the processor may collect an outside air temperature for each region in real time (S311) in step (S310) of collecting main weather factors (or the external environmental factors).

For example, the processor may identify the outside air temperature of the region including the travel route of the ego vehicle of the real-time information related to the external environmental factors. For example, the processor may classify the region including the travel route into the plurality of temperature regions including the first temperature region, the second temperature region, and the third temperature region based on the outside air temperature. The first temperature region may include the region in which the outside air temperature is equal to or higher than the first temperature, the second temperature region may include the region in which the outside air temperature is lower than the first temperature and equal to or higher than the second temperature, and the third temperature region may include the region in which the outside air temperature is lower than the second temperature. For example, the second temperature may include the temperature lower than the first temperature.

According to one embodiment, the processor may collect an outside air speed for each region in real time (S313) in step (S310) of collecting the main weather factors (or the external environmental factors).

For example, the processor may identify the outside air speed of the region including the travel route of the ego vehicle of the real-time information related to the external environmental factors. For example, the processor may identify the region including the travel route by classify the same into the plurality of wind speed regions including the first wind speed region, the second wind speed region, and the third wind speed region based on the outside air speed. The first wind speed region may include the region in which the outside air speed is lower than the first speed, the second wind speed region may include the region in which the outside air speed is equal to or higher than the first speed and lower than the second speed, and the third wind speed region may include the region in which the outside air speed is equal to or higher than the second speed. For example, the second speed may include the speed higher than the first speed.

According to one embodiment, the processor may collect the weather for each region in real time (S315) in step (S310) of collecting the main weather factors (or the external environmental factors).

For example, the processor may classify a weather including the snow, the rain, the hail, and the typhoon as the first weather, and classify other weathers (e.g., sunny, overcast, or cloudy) as the second weather. For example, the processor may distinguish the region including the travel route based on the first weather and the second weather. The processor may identify the weather near charging station using the collected weather information and charging station location information.

Figure 4:
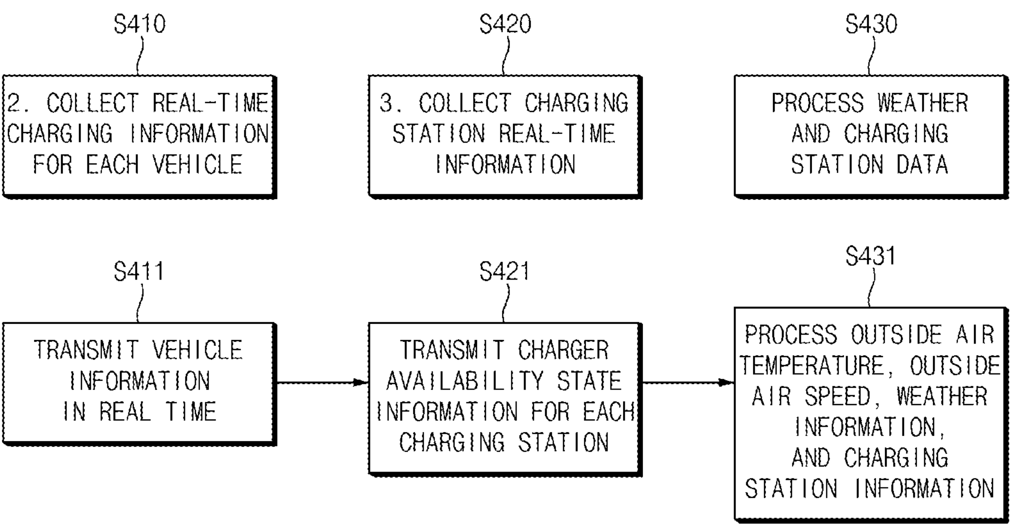
FIG. 4 is a conceptual diagram illustrating operations of a charging station recommendation device according to an embodiment of the present disclosure.

FIG. 4 is a conceptual diagram illustrating operations of a charging station recommendation device according to an embodiment of the present disclosure. In relation to the contents of FIG. 4, contents corresponding to or duplicated with the above contents may be briefly described or omitted. In a following embodiment, steps (or operations) from S410 to S430 may be performed by the at least one processor that is electrically connected the data collection device, the data processing device, the data storage device, and the data application device included in a charging station recommendation device (e.g., the charging station recommendation device 101 in FIG. 1). In addition, in a following embodiment, operations S411, S421, and S431 may be performed by the at least one processor respectively in steps S410, S420, and S430.

According to one embodiment, the processor may collect the real-time information of the at least one vehicle related to the charging station (S411) in step (S410) of collecting real-time charging information for each vehicle.

For example, the processor may receive vehicle information in real time from the at least one vehicle (e.g., the external device 102 in FIG. 1) that is traveling to the plurality of charging stations or being charged at the plurality of charging stations. As an example, real-time information of the vehicle may include at least one of current remaining battery power of the vehicle, charging station stopover information, information on estimated arrival to the charging station or an estimated charging time after the arrival to the charging station, a charger fastening time, an expected charging time, or any combination thereof.

According to one embodiment, the processor may receive charging station real-time data including charger availability state information for each charging station (S421) in step (S420) of collecting charging station real-time information.

For example, the charging station real-time data may include basic information of the charging station (e.g., the location information of the charging station, the nearby amenity information, the charging fee information, the operating hours, the information on the vehicle being charged, the information on the vehicle scheduled to be charged, the daily average charging time information, the weather near charging station, the charging station type, the charging fee, the parking fee, whether the charger is charging the vehicle, whether the charger is available, the type (e.g., the ultrahigh speed type, the high speed type, or the low speed type) of the charger, whether the charger is broken, or at least one of any combination thereof).

According to one embodiment, the processor may process the outside air temperature, the outside air speed, the weather information, and the charging station information (S431) in step (S430) of processing weather and charging station data.

For example, the processor may classify a region included in the travel route of the ego vehicle into a plurality of regions using the collected outside air temperature information.

For example, the processor may classify the region included in the travel route of the ego vehicle into a plurality of regions using the collected outside air speed information.

For example, the processor may classify the plurality of charging stations into the charging stations of the first group and the charging stations of the second group using the collected weather information and charging station installation type information.

Figure 5:
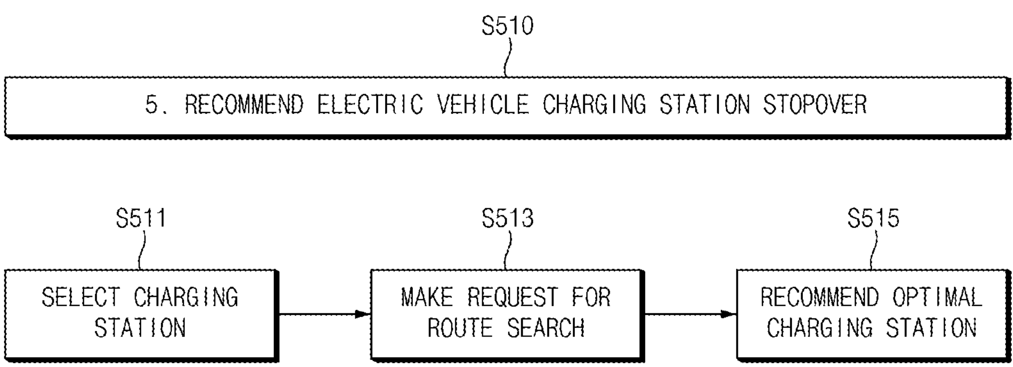
FIG. 5 is a conceptual diagram illustrating operations of a charging station recommendation device according to an embodiment of the present disclosure.

FIG. 5 is a conceptual diagram illustrating operations of a charging station recommendation device according to an embodiment of the present disclosure. In relation to the contents of FIG. 5, contents corresponding to or duplicated with the above contents may be briefly described or omitted.

In a following embodiment, step (or operation) of S510 may be performed by the at least one processor that is electrically connected the data collection device, the data processing device, the data storage device, and the data application device included in a charging station recommendation device (e.g., the charging station recommendation device 101 in FIG. 1). In addition, in a following embodiment, operations S511, S513, and S515 may be performed by the at least one processor respectively in step S510.

According to one embodiment, the processor may select the charging station (S511) in step (S510) of recommending the electric vehicle charging station stopover.

For example, the processor may select at least some charging stations among the plurality of charging stations using the processing information generated in step S430 described above.

According to one embodiment, the processor may identify a route search request (S513) in step (S510) of recommending the electric vehicle charging station stopover.

For example, the processor may identify at least one of a current location of the ego vehicle, a location of the destination, the distance to the destination, whether the ego vehicle is able to reach the destination, information on at least one charging station existing on the travel route, or any combination thereof based on the identification of the route search request. In this case, whether the ego vehicle is able to reach the destination may be identified in consideration of the data of the ego vehicle and the external environmental factors.

According to one embodiment, the processor may recommend the optimal charging station (S515) in step (S510) of recommending the electric vehicle charging station stopover.

For example, the processor may provide the optimal charging station to the ego vehicle from the recommended charging station list generated based on the processing information.

Figure 6:
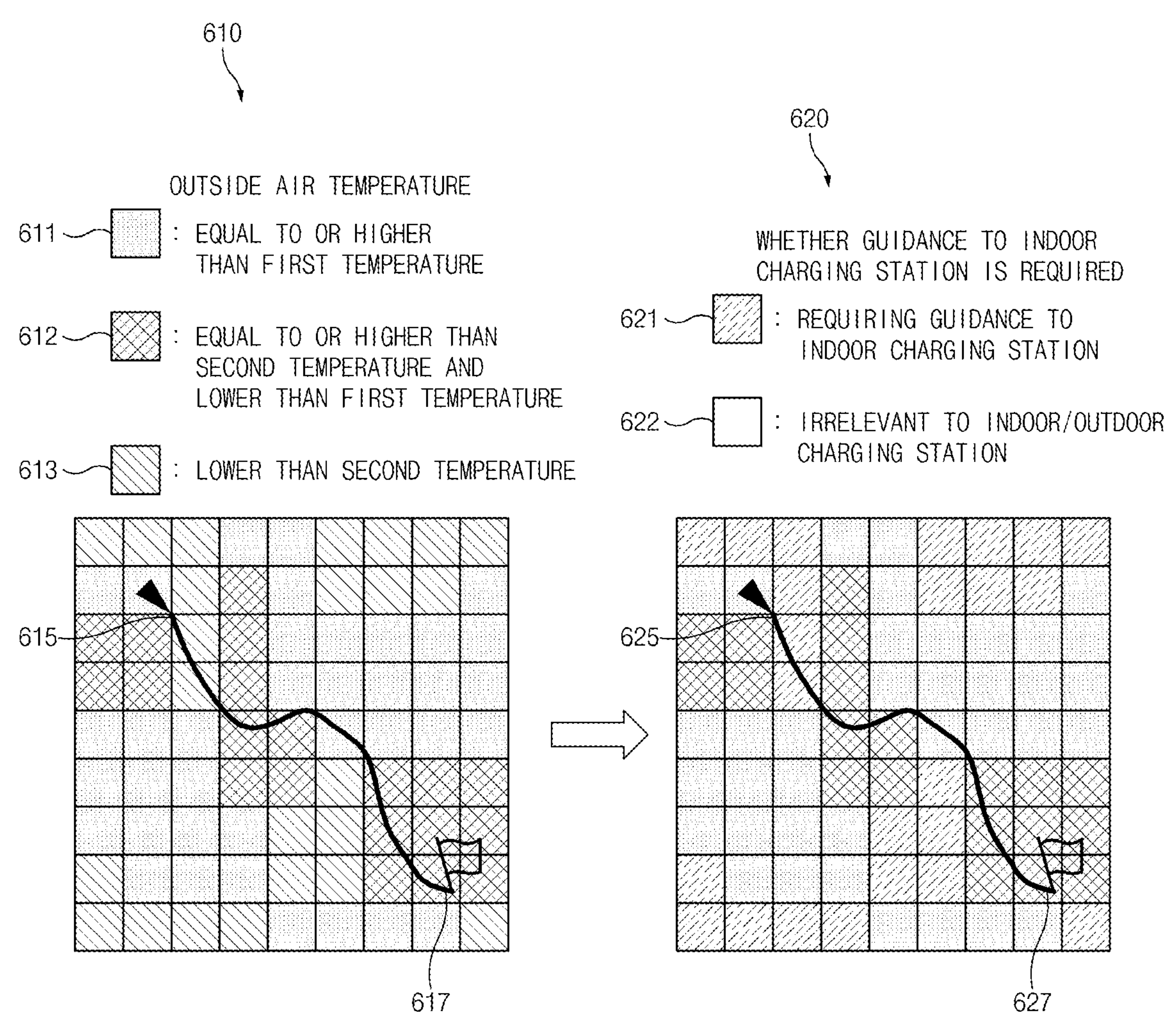
FIG. 6 is a conceptual diagram related to an operation in which a charging station recommendation device according to an embodiment of the present disclosure selects a charging station to be recommended to an ego vehicle in consideration of an outside air temperature.

FIG. 6 is a conceptual diagram related to an operation in which a charging station recommendation device according to an embodiment of the present disclosure selects a charging station to be recommended to an ego vehicle in consideration of an outside air temperature.

According to one embodiment, a charging station recommendation device (e.g., the charging station recommendation device 101 in FIG. 1) may classify the region including the travel route into the plurality of regions. With reference to 610, according to one embodiment, the charging station recommendation device may classify a region including a travel route from a current location 615 to a destination 617 into a plurality of regions, based on the outside air temperature.

For example, the charging station recommendation device may identify the outside air temperature of the region including the travel route of the ego vehicle, and classify the region into a plurality of temperature regions including a first temperature region 611, a second temperature region 612, and a third temperature region 613 based on the outside air temperature. As an example, the first temperature region 611 may include a region in which the outside air temperature is equal to or higher than the first temperature, the second temperature region 612 may include a region in which the outside air temperature is lower than the first temperature and equal to or higher than the second temperature, and the third temperature region 613 may include a region in which the outside air temperature is lower than the second temperature. For example, the second temperature may include the temperature lower than the first temperature.

With reference to 620, according to one embodiment, the charging station recommendation device may recommend a charging station of the indoor type to the driver in at least some of the regions classified based on the outside air temperature.

For example, the charging station recommendation device may distinguish the third temperature region 613 of a region including a travel route from a current location 625 to a destination 627 as a region 621 requiring guidance to the indoor charging station. In other words, the charging station recommendation device may generate the processing information for generating the charging station list such that only the charging station of the indoor type is recommended as the optimal charging station in a region in which the temperature is lower than the specified temperature (e.g., the second temperature).

For example, the charging station recommendation device may distinguish a portion of the remaining region except for the third temperature region 613 of the region including the travel route from the current location 625 to the destination 627 as an indoor/outdoor charging station irrelevant region 622.

Figure 7:
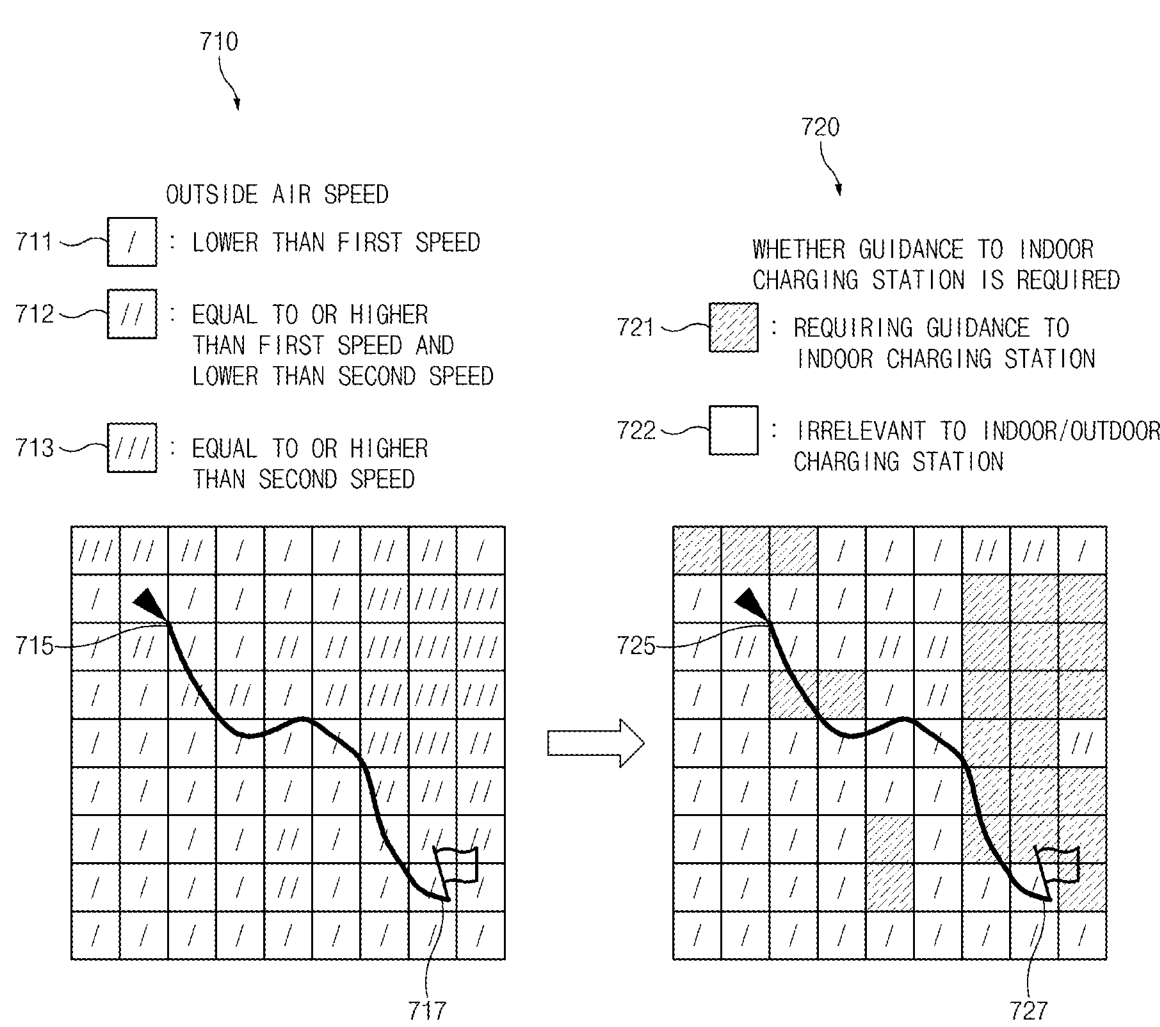
FIG. 7 is a conceptual diagram related to an operation in which a charging station recommendation device according to an embodiment of the present disclosure selects a charging station to be recommended to an ego vehicle in consideration of an outside air speed.

FIG. 7 is a conceptual diagram related to an operation in which a charging station recommendation device according to an embodiment of the present disclosure selects a charging station to be recommended to an ego vehicle in consideration of an outside air speed.

According to one embodiment, a charging station recommendation device (e.g., the charging station recommendation device 101 in FIG. 1) may classify the region including the travel route into the plurality of regions.

With reference to 710, according to one embodiment, the charging station recommendation device may classify a region including a travel route from a current location 715 to a destination 717 into a plurality of regions, based on the outside air speed.

For example, the charging station recommendation device may identify the outside air speed of the region including the travel route of the ego vehicle, and classify the region into a plurality of wind speed regions including a first wind speed region 711, a second wind speed region 712, and a third wind speed region 713 based on the outside air speed. As an example, the first wind speed region 711 may include a region in which the outside air speed is lower than the first speed, the second wind speed region 712 may include a region in which the outside air speed is equal to or higher than the first speed and lower than the second speed, and the third wind speed region 713 may include a region in which the outside air speed is equal to or higher than the second speed. For example, the second speed may include the speed higher than the first speed.

With reference to 720, according to one embodiment, the charging station recommendation device may recommend a charging station of the indoor type to the driver in at least some of the regions classified based on the outside air speed and/or at least some of the regions classified based on the outside air temperature.

For example, the charging station recommendation device may distinguish the third wind speed region 713 of a region including a travel route from a current location 725 to a destination 727 as a region 721 requiring guidance to the indoor charging station. In other words, the charging station recommendation device may generate the processing information for generating the charging station list such that only the charging station of the indoor type is recommended as the optimal charging station in a region in which the wind speed is higher than the specified speed (e.g., the second speed).

For example, the charging station recommendation device may distinguish whether the remaining region except for the third wind speed region 713 of the region including the travel route from the current location 725 to the destination 727 is a region requiring guidance to the charging station of the indoor type considering the outside air temperature together. As an example, the charging station recommendation device may generate the processing information for generating the charging station list such that only a charging station of the indoor type is recommended as the optimal charging station in a region in which the third temperature region 613 in FIG. 6 and the first wind speed region 711 overlap each other and a region in which the second temperature region 612 in FIG. 6 and the second wind speed region 712 overlap each other. In other words, the data processing device 120 may generate the processing information such that only a charging station of the indoor type is recommended to the ego vehicle among charging stations installed in a specific region when the specific region satisfies both the specified range of the outside air speed and the specified range of the outside air temperature.

Figure 8:
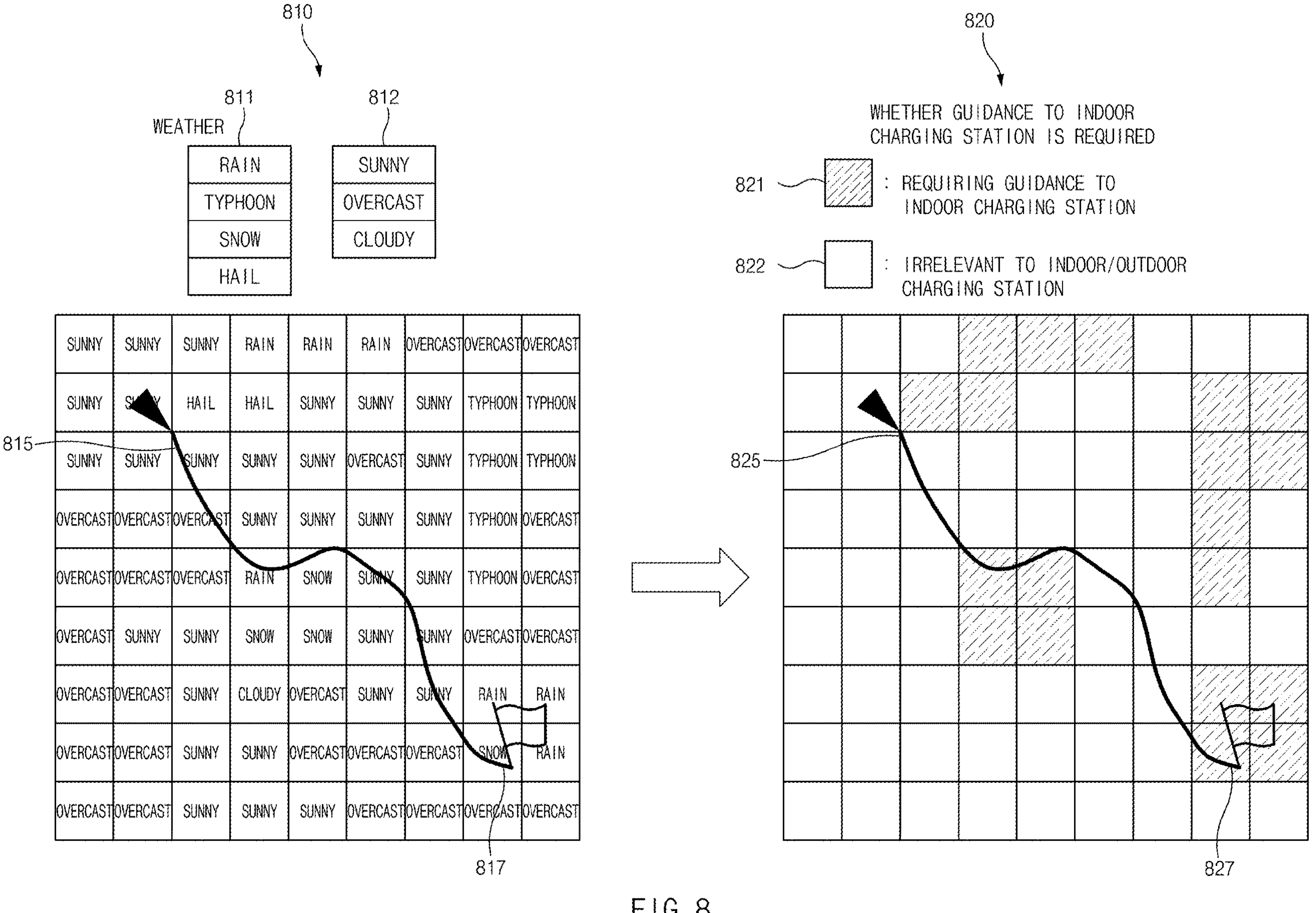
FIG. 8 is a conceptual diagram related to an operation in which a charging station recommendation device according to an embodiment of the present disclosure selects a charging station to be recommended to an ego vehicle in consideration of a weather.

FIG. 8 is a conceptual diagram related to an operation in which a charging station recommendation device according to an embodiment of the present disclosure selects a charging station to be recommended to an ego vehicle in consideration of a weather.

According to one embodiment, a charging station recommendation device (e.g., the charging station recommendation device 101 in FIG. 1) may classify the region including the travel route into the plurality of regions.

With reference to 810, according to one embodiment, the charging station recommendation device may classify a region including a travel route from a current location 815 to a destination 817 into a plurality of regions based on the outside air speed.

For example, the charging station recommendation device may identify a weather of the region including the travel route of the ego vehicle, and classify the region into a plurality of weather regions including a first weather region 811 with the snow, the rain, the hail, and the typhoon and a second weather region 812 with the remaining weathers (e.g., sunny, overcast, or cloudy) based on the weather.

With reference to 820, according to one embodiment, the charging station recommendation device may recommend a charging station of the indoor type to the driver in at least some of the regions classified based on the weather.

For example, the charging station recommendation device may distinguish the first weather region 811 of a region including a travel route from a current location 825 to a destination 827 as a region 821 requiring guidance to the indoor charging station. In other words, the charging station recommendation device may generate the processing information for generating the charging station list such that only the charging station of the indoor type is recommended as the optimal charging station in a region identified to be with a specified weather (e.g., the first weather).

For example, the charging station recommendation device may distinguish the second weather region 812 of the region including the travel route from the current location 825 to the destination 827 as an indoor/outdoor charging station irrelevant region 822.

Figure 9:
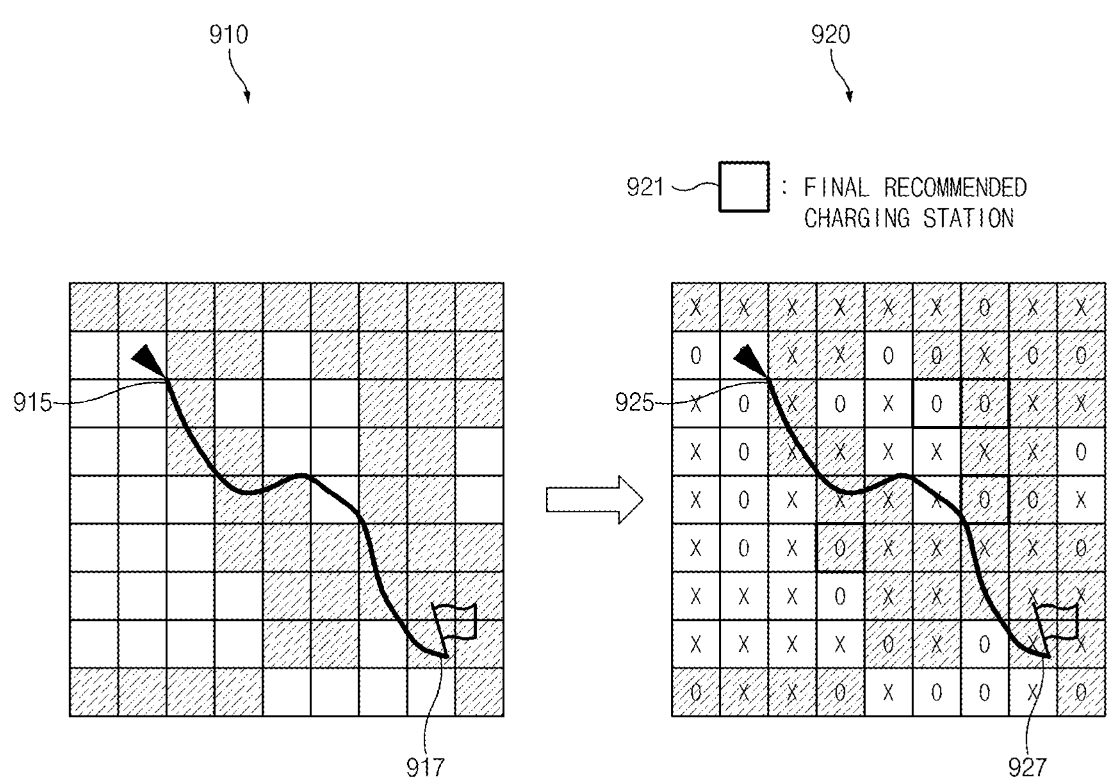
FIG. 9 is a conceptual diagram related to an operation in which a charging station recommendation device finally selects a charging station to be recommended to an ego vehicle according to an embodiment of the present disclosure.

FIG. 9 is a conceptual diagram related to an operation in which a charging station recommendation device finally selects a charging station to be recommended to an ego vehicle according to an embodiment of the present disclosure.

With reference to 910, according to one embodiment, the charging station recommendation device may identify the regions 621, 721, and 821 requiring the guidance to the indoor charging station derived from the embodiments of FIGS. 6 to 8.

For example, the charging station recommendation device may identify regions requiring guidance to the indoor charging station for recommending a charging station of the indoor type as the optimal charging station from a region including a travel route from a current location 915 to a destination 917.

With reference to 920, according to one embodiment, the charging station recommendation device may identify a final recommended charging station 921.

For example, the charging station recommendation device may finally identify regions requiring guidance to the indoor charging station from a region including a travel route from a current location 925 to a destination 927, and select a charging station of a region in which the charging station of the indoor type exists of the identified region as the final recommended charging station 921. As an example, in consideration of the travel route, the charging station recommendation device may exclude a charging station of a region spaced apart by a specified distance from the travel route from the final recommended charging station 921 even though the excluded charging station corresponds to the charging station of the indoor type.

For example, the charging station recommendation device may select the optimal charging station by further considering other external factors with respect to an indoor/outdoor charging station irrelevant region (e.g., the indoor/outdoor charging station irrelevant regions 622, 722, and 822 in FIGS. 6 to 8) excluding a region identified in consideration of the external environmental factors. As an example, the charging station recommendation device may select the final recommended charging station 921 existing in the indoor/outdoor charging station irrelevant region based on at least one of the charging station preference of the driver, the charging fee, the parking fee, the real-time information of the plurality of charging stations, or any combination thereof.

Figure 10:
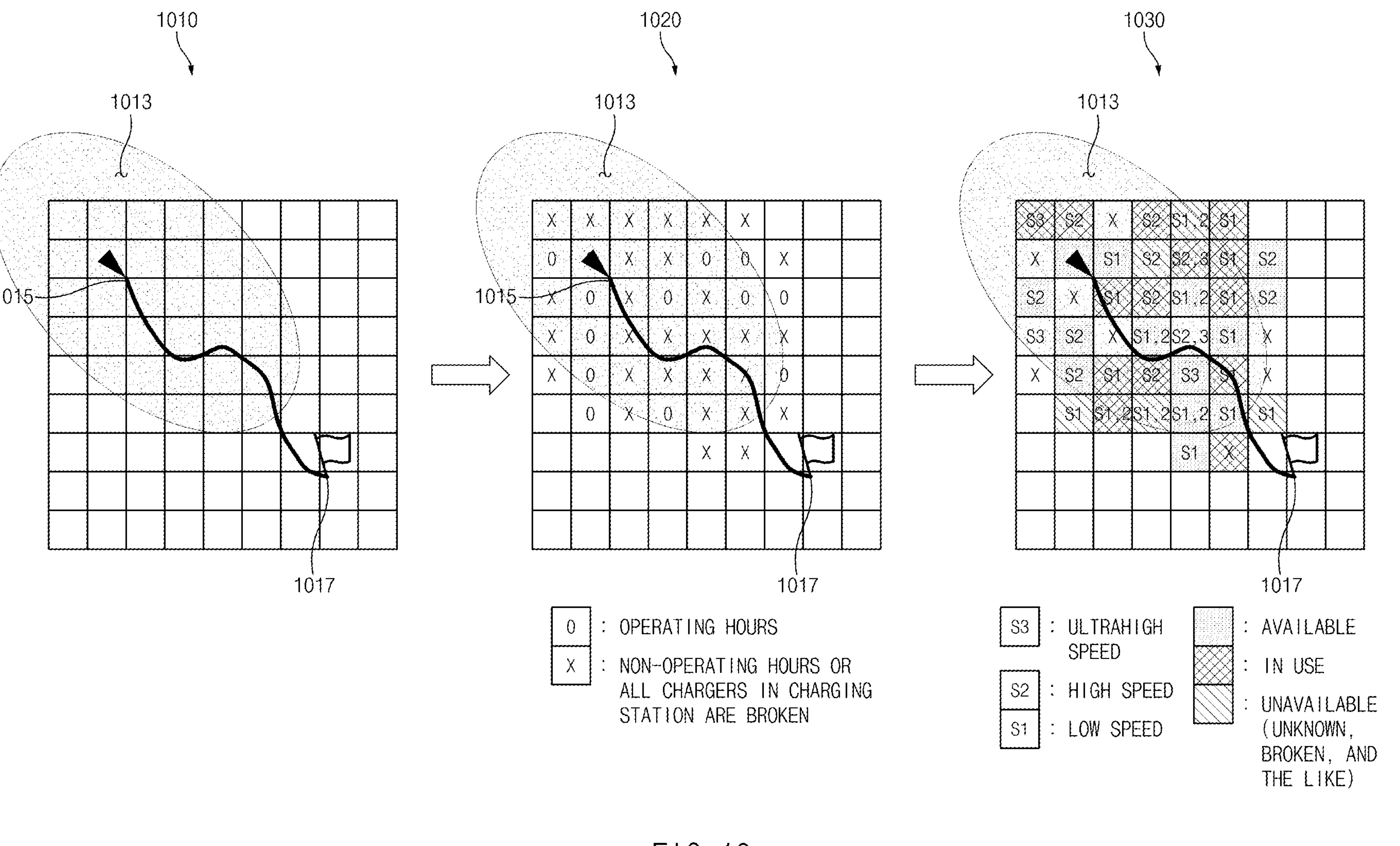
FIG. 10 is a conceptual diagram related to an operation in which a charging station recommendation device selects a charging station to be recommended to an ego vehicle according to an embodiment of the present disclosure.

FIG. 10 is a conceptual diagram related to an operation in which a charging station recommendation device selects a charging station to be recommended to an ego vehicle according to an embodiment of the present disclosure.

According to one embodiment, a charging station recommendation device (e.g., the charging station recommendation device 101 in FIG. 1) may generate (or process) the processing information for generating the charging station list based on one of the data of the ego vehicle (e.g., the location information of the ego vehicle, the state of charge of the battery, the distance to empty, or one of combinations thereof), the charging station operating hours, the whether the charger is broken, the type (e.g., the ultrahigh speed type, the high speed type, or the low speed type) of the charger, or any combination thereof.

With reference to 1010, according to one embodiment, when a destination 1017 of the ego vehicle is set, the charging station recommendation device may identify a travelable distance based on the data of the ego vehicle, and identify a region 1013 including a travel route between a current location 1015 of the ego vehicle and the destination 1017 within the travelable distance.

For example, the charging station recommendation device may identify the region 1013 including the travel route based on at least one of the location information of the ego vehicle the state of charge of the battery, the distance to empty, or any combination thereof included in the data of the ego vehicle.

For example, regions within a maximum travelable distance based on a forward direction toward the destination 1017 of the ego vehicle, and regions within a distance at which the charging station recommendation is required based on a rearward direction of the ego vehicle may be identified. The charging station recommendation device may identify the region 1013 including the travel route, including the regions identified in the forward direction and the rearward direction.

With reference to 1020 and 1030, according to one embodiment, the charging station recommendation device may identify a plurality of charging stations in the region 1013 including the identified travel route, receive charging station real-time information from the plurality of charging stations, and identify at least one charging station for generating the charging station list based on the received information.

For example, the charging station recommendation device may select the at least one charging station for generating the charging station list in consideration of operating hours of each of the plurality of charging stations in the region 1013 including the travel route. As an example, the charging station recommendation device may identify charging stations that operate for a time until the ego vehicle arrives at the destination, and select the operating charging stations as the at least one charging station for generating the charging station list. As an example, the charging station recommendation device may determine whether chargers included in the charging station are broken, and exclude a charging station in which all chargers are broken from the at least one charging station for generating the charging station list.

For example, the charging station recommendation device may identify the at least one charging station for generating the charging station list in consideration of a charger type and usage state information of each of the plurality of charging stations in the region 1013 including the travel route. As an example, the charging station recommendation device may identify the at least one charging station for generating the charging station list based on at least one of the number of each type (e.g., the ultrahigh speed type, the high speed type, or the low speed type) of the chargers included in the charging station, the number of chargers available at a time of arrival of the ego vehicle, the charging station expected congestion levels, or any combination thereof.

Figure 11:
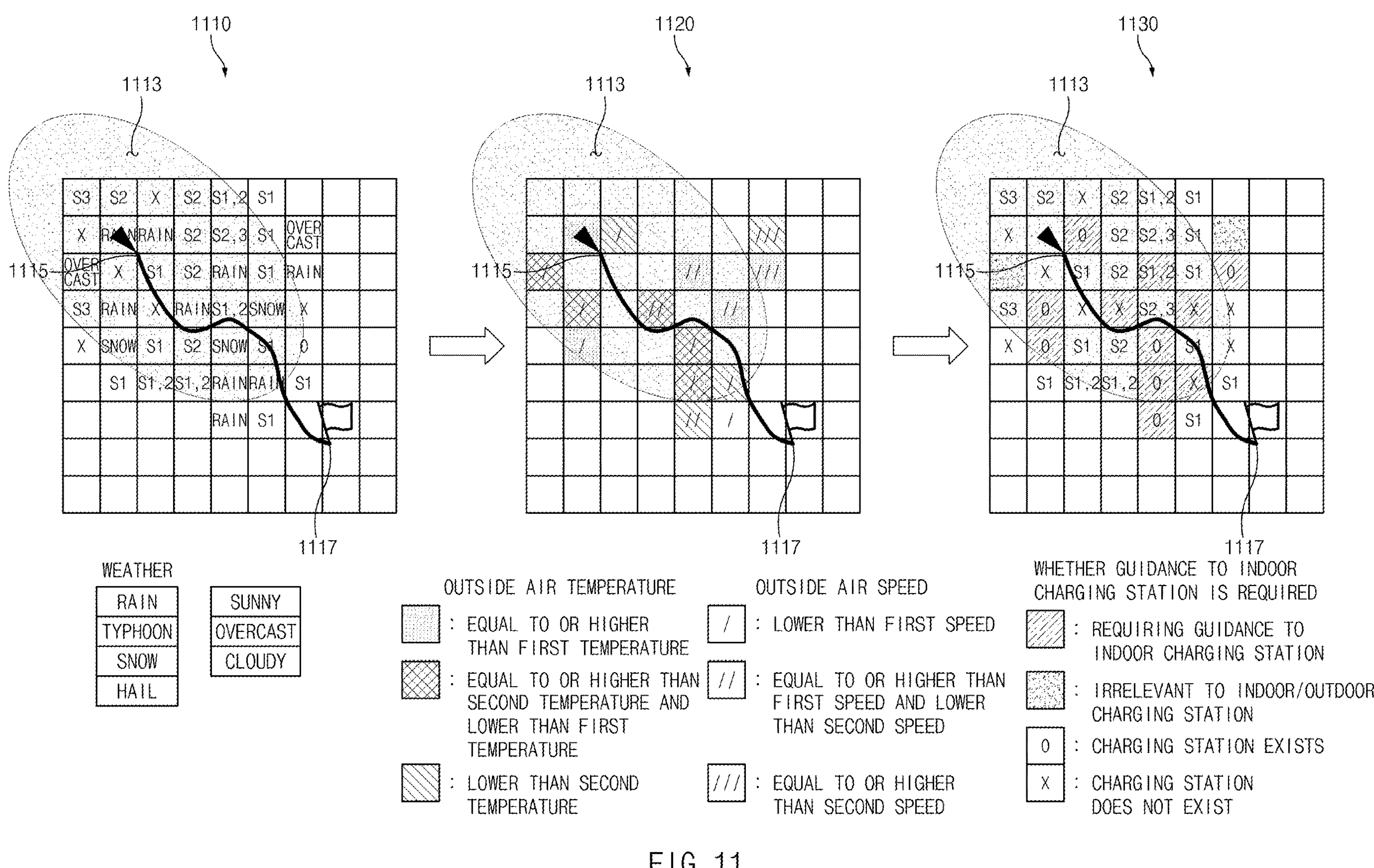
FIG. 11 is a conceptual diagram illustrating an operation in which a charging station recommendation device according to an embodiment of the present disclosure selects a charging station to be recommended to an ego vehicle.

FIG. 11 is a conceptual diagram illustrating an operation in which a charging station recommendation device according to an embodiment of the present disclosure selects a charging station to be recommended to an ego vehicle. In relation to the contents of FIG. 11, contents corresponding to or duplicated with the above contents may be briefly described or omitted.

According to one embodiment, a charging station recommendation device (e.g., the charging station recommendation device 101 in FIG. 1) may generate (or process) the processing information for generating the charging station list based on the external environmental factors. As in the embodiment of FIG. 10 described above, the charging station recommendation device may identify a region 1113 including a travel route between a current location 1115 of the ego vehicle and a destination 1117.

With reference to 1110 and 1120, according to one embodiment, the charging station recommendation device may identify a plurality of charging stations in the region 1113 including the travel route. The charging station recommendation device may select at least one charging station for generating the charging station list based on the external environmental factors (e.g., the weather, the outside air temperature, and the outside air speed).

For example, the charging station recommendation device may select a charging station of the indoor type among at least one charging station existing in a region corresponding to the first weather (e.g., the rain, the typhoon, the snow, or the hail) as the at least one charging station for generating the charging station list.

For example, the charging station recommendation device may select a charging station of the indoor type among at least one charging station existing in a region in which the outside air temperature is lower than the second temperature as the at least one charging station for generating the charging station list.

For example, the charging station recommendation device may select a charging station of the indoor type among at least one charging station existing in a region in which the outside air speed is equal to or higher than the second speed as the at least one charging station for generating the charging station list.

With reference to 1130, according to one embodiment, the charging station recommendation device may identify the at least one charging station selected in 1110 and 1120 described above.

For example, the charging station recommendation device may determine whether the charging stations identified in 1110 and 1120 exist in a region requiring guidance to the indoor charging station.

For example, when a charging station exists in the region requiring the guidance to the indoor charging station, the charging station recommendation device may identify whether the corresponding charging station is the charging station of the indoor type.

For example, the charging station recommendation device may generate the processing information for determining the charging station of the indoor type existing in the region requiring the guidance to the indoor charging station as the at least one charging station included in the charging station list.

For example, the charging station recommendation device may generate the processing information for determining all charging stations existing in the indoor/outdoor charging station irrelevant region as the at least one charging station included in the charging station list.

Figure 12:
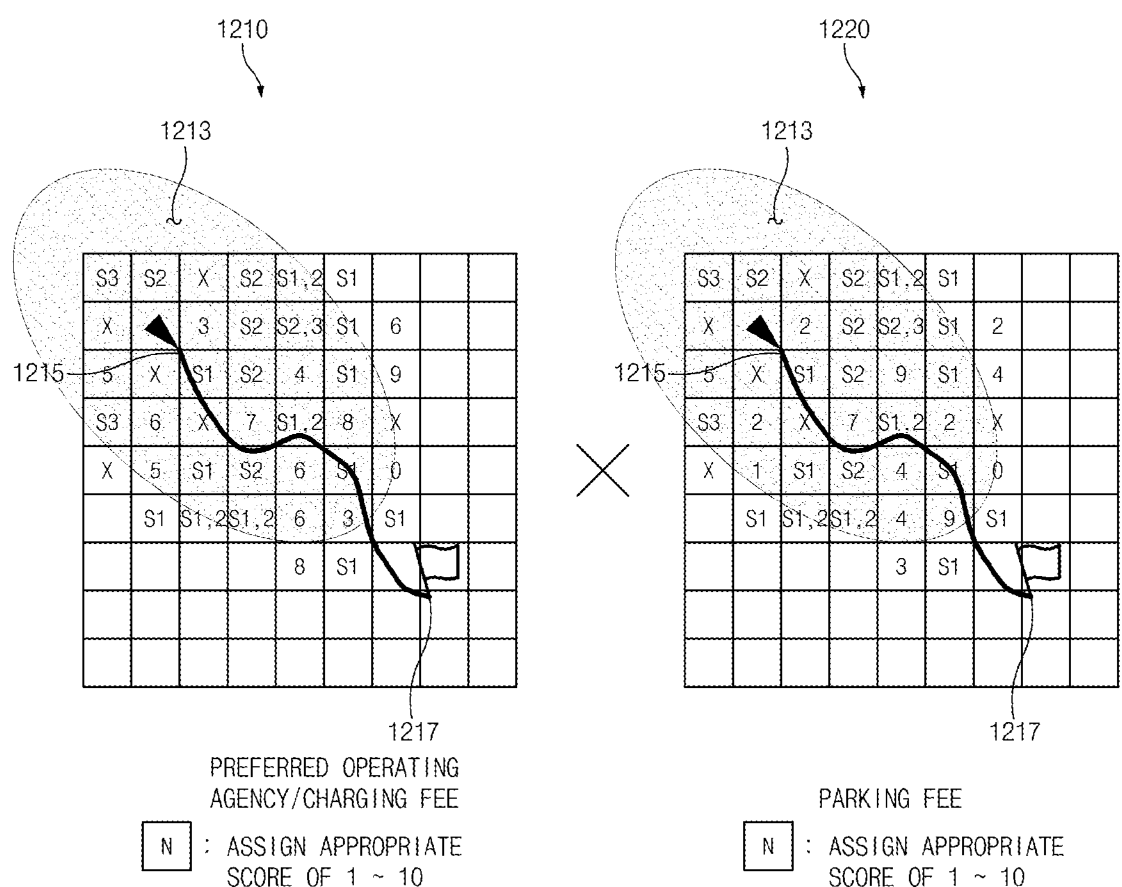
FIG. 12 is a conceptual diagram illustrating an operation in which a charging station recommendation device according to an embodiment of the present disclosure selects a charging station to be recommended to an ego vehicle.

FIG. 12 is a conceptual diagram illustrating an operation in which a charging station recommendation device according to an embodiment of the present disclosure selects a charging station to be recommended to an ego vehicle. In relation to the contents of FIG. 12, contents corresponding to or duplicated with the above contents may be briefly described or omitted.

According to one embodiment, a charging station recommendation device (e.g., the charging station recommendation device 101 in FIG. 1) may generate (or process) the processing information for generating the charging station list based on various factors. As in the embodiments of FIGS. and 11 described above, the charging station recommendation device may identify a region 1213 including a travel route between a current location 1215 of the ego vehicle and a destination 1217.

With reference to 1210 and 1220, according to one embodiment, the charging station recommendation device may identify a plurality of charging stations in the region 1213 including the travel route. The charging station recommendation device may assign a specific weight to each of the plurality of charging stations based on a preference of the driver and a fee.

For example, the charging station recommendation device may assign a weight determined in consideration of the preference of the driver related to the charging station (e.g., at least one of a preferred operating agency of the driver, a preferred charger type of the driver, a charging history of the driver, or any combination thereof) with respect to each of the plurality of charging stations.

For example, the charging station recommendation device may assign a weight determined in consideration of various fees (e.g., the parking fee and/or the charging fee) when using the charging station with respect to each of the plurality of charging stations.

Figure 13:
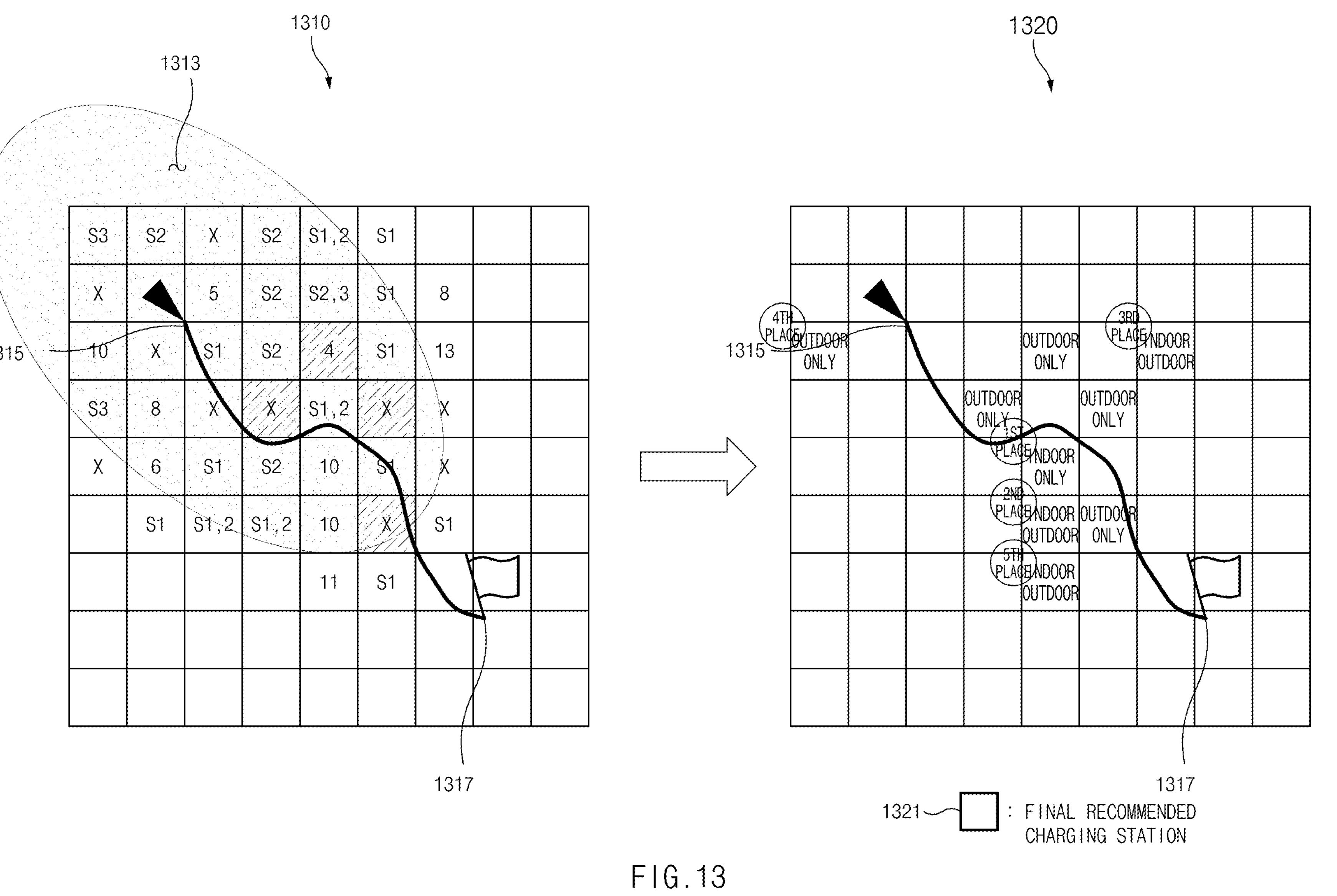
FIG. 13 is a conceptual diagram illustrating an operation in which a charging station recommendation device according to an embodiment of the present disclosure selects a charging station to be recommended to an ego vehicle.

FIG. 13 is a conceptual diagram illustrating an operation in which a charging station recommendation device according to an embodiment of the present disclosure selects a charging station to be recommended to an ego vehicle. In relation to the contents of FIG. 13, contents corresponding to or duplicated with the above contents may be briefly described or omitted.

According to one embodiment, a charging station recommendation device (e.g., the charging station recommendation device 101 in FIG. 1) may generate (or process) the processing information for generating the charging station list based on the various factors. As in the embodiments of FIGS. 10 and 12 described above, the charging station recommendation device may identify a region 1313 including a travel route between a current location 1315 of the ego vehicle and a destination 1317.

With reference to 1310, according to one embodiment, the charging station recommendation device may identify the determined (or selected) charging stations based on the embodiments of FIGS. 10 to 12 described above, and match a specific value to each of the charging stations.

For example, the charging station recommendation device may assign the weight to each of the charging stations based on the operations performed in the embodiments of FIGS. 10 to 12 described above, and match the specific value determined by calculating a sum of the assigned weights to each of the charging stations.

With reference to 1320, according to one embodiment, the charging station recommendation device may identify at least one final recommended charging station 1321 using the specific value matched to each of the charging stations.

For example, the charging station recommendation device may identify a specific value matched to each of the at least one final charging station 1321, and assign a priority to the at least one final charging station 1321 based on the specific value. The charging station recommendation device may provide the at least one final charging station 1321 to which the priority is assigned to the ego vehicle. For example, a charging station recommended with a first priority may be the charging station of the indoor type existing in the region requiring the guidance to the indoor charging station. As an example, charging stations recommended with second, third, and fifth priorities may be the charging stations of the indoor and outdoor types existing in the region requiring the guidance to the indoor charging station. For example, a charging station recommended with a fourth priority may be the charging station existing in the indoor/outdoor charging station irrelevant region. As an example, after the final charging station 1321 is determined, the charging station recommendation device may assign the priority by further considering a distance from the travel route between the current location 1315 of the ego vehicle and the destination 1317.

In the embodiment described above, the operations in which the charging station recommendation device generates the charging station list based on at least one of the external environmental factors, the real-time information of the plurality of charging stations, and the real-time information related to the plurality of charging stations are disclosed, but embodiments of the present disclosure are not limited thereto. For example, the charging station recommendation device may select the at least one charging station included in the charging station list further using congestion level information (or the expected congestion level) for each charging station. Such embodiment may be referred to in detail in description of FIGS. 14 to 15 to be described later.

Figure 14:
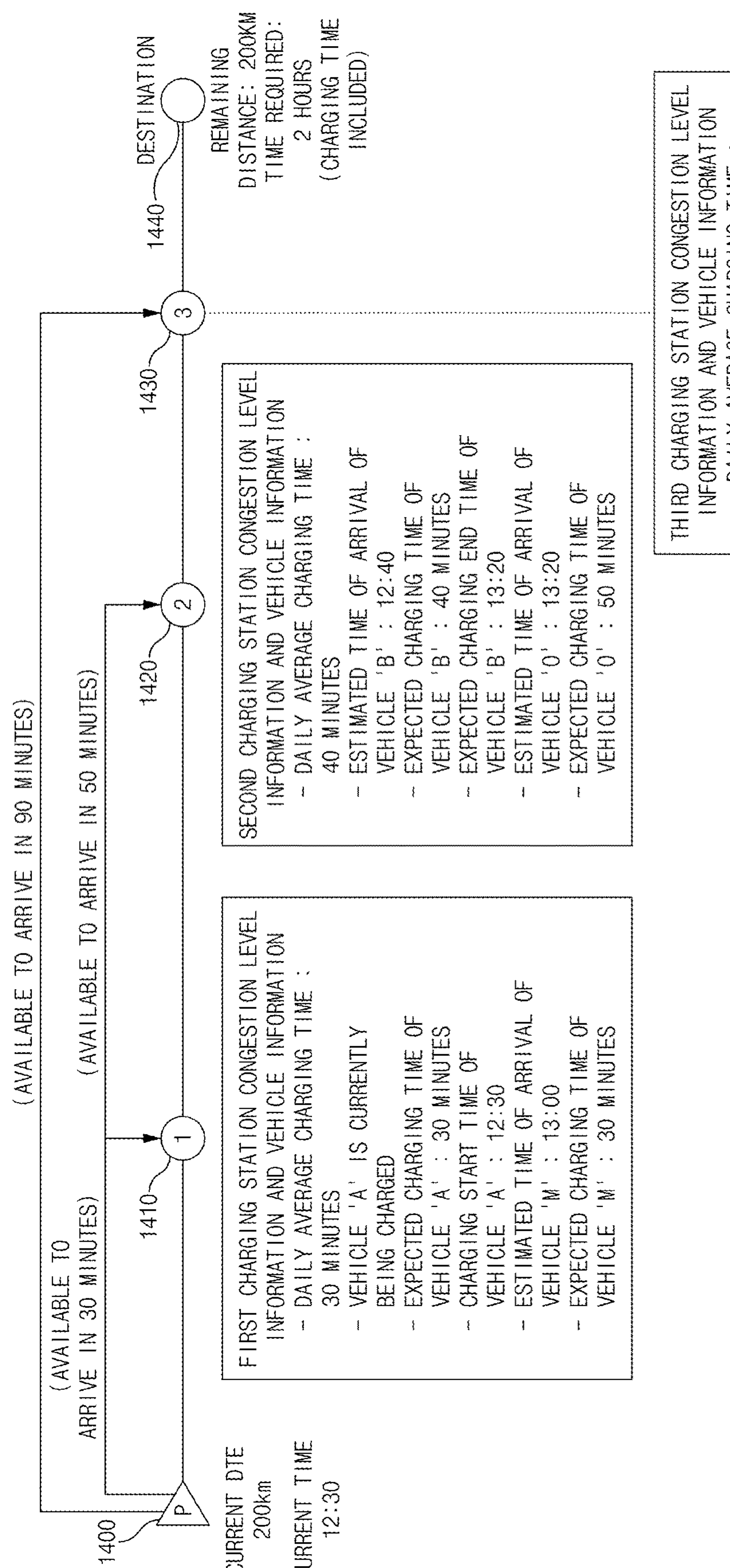
FIG. 14 is a conceptual diagram related to an operation in which a charging station recommendation device according to an embodiment of the present disclosure recommends a charging station using congestion level information for each charging station and real-time information of a vehicle.

FIG. 14 is a conceptual diagram related to an operation in which a charging station recommendation device according to an embodiment of the present disclosure recommends a charging station using congestion level information for each charging station and real-time information of a vehicle.

Referring to FIG. 14, in the device and the method for recommending the charging station according to one embodiment, when it is determined based on a destination 1440 of the ego vehicle (e.g., a vehicle 'P' 1400) being set that the destination 1440 is not reachable, a charging station recommendation device (e.g., the charging station recommendation device 101 in FIG. 1) may recommend an optimal charging station to the vehicle 'P' 1400 using the expected congestion level for each charging station and the vehicle information.

According to one embodiment, the charging station recommendation device may determine whether the destination 1440 is reachable corresponding to the destination 1440 of the vehicle 'P' 1400 being set. For example, the charging station recommendation device may determine whether the destination 1440 is reachable based on the data of the ego vehicle 1400 and the real-time information related to the external environmental factors. For example, the data of the ego vehicle may include at least one of the location information of the ego vehicle, the state of charge (SoC) of the battery, the distance to empty (DTE), or any combination thereof. For example, the real-time information related to the external environmental factors may include at least one of an outside air temperature, an outside air speed, and a weather near the vehicle 'P' 1400, an outside air temperature, an outside air speed, and a weather of a route to the destination, or any combination thereof.

According to one embodiment, the charging station recommendation device may recommend the optimal charging station to the vehicle 'P' 1400 based on the data of the vehicle and a current time when it is determined that the destination 1440 is not reachable corresponding to the destination 1440 of the vehicle 'P' 1400 being set.

According to one embodiment, when the distance to empty of the ego vehicle is equal to or lower than a remaining distance to the destination 1440, the charging station recommendation device may determine that the destination 1440 is not reachable.

For example, the remaining distance from a current location of the vehicle 'P' 1400 to the set destination 1440 may be 200 km, and a time required for arrival may be 2 hours. In addition, for example, a distance to empty of the vehicle 'P' 1400 may be 200 km, and a destination search request time (or the current time) may be 12:30. In this case, the charging station recommendation device may determine that the vehicle 'P' 1400 is not able to reach the destination 1440.

According to one embodiment, the charging station recommendation device may recommend the optimal charging station to the vehicle 'P' 1400 based on the expected congestion levels of the plurality of charging stations. For example, the charging station recommendation device may calculate the expected congestion level of each of the plurality of charging stations based on the real-time information of the plurality of charging stations and the real-time information of the at least one vehicle, generate the processing information including the optimal charging station based on the calculated expected congestion level, and generate the charging station list for recommending charging stations to the vehicle 'P' 1400 using the processing information. For example, the real-time information of the plurality of charging stations may include at least one of the location information, the type of the charger, the nearby amenity information, the charging fee information, the operating hours, the information on the vehicle being charged, the information on the vehicle scheduled to be charged, the daily average charging time information, or a combination thereof. For example, the real-time information of the at least one vehicle may include at least one of the estimated time of arrival to the charging station, the expected charging end time, the expected time required for the charging, or a combination thereof.

According to one embodiment, real-time information of a first charging station 1410, a second charging station 1420, and a third charging station 1430 and the vehicle information may include at least one of a daily average charging time, an expected charging time, and a charging start time or an expected charging end time.

For example, a daily average charging time of the first charging station 1410 may be 30 minutes, and a vehicle 'A' may be currently being charged at the first charging station 1410. In addition, for example, an expected charging time of the vehicle 'A' may be 30 minutes, a charging start time of the vehicle 'A' may be 12:30, and an expected charging end time of the vehicle 'A' may be 13:00.

In addition, for example, a vehicle 'M' may be currently traveling to the first charging station 1410. In addition, for example, an expected charging time of the vehicle 'M' may be 30 minutes, an estimated time of arrival of the vehicle 'M' may be 13:00, and an expected charging end time of the vehicle 'M' may be 13:30. In addition, for example, an estimated time of arrival to the first charging station 1410 of the vehicle 'P' 1400 may be 30 minutes.

In addition, for example, a daily average charging time of the second charging station 1420 may be 40 minutes, and a vehicle 'B' may be currently traveling to the second charging station 1420. In addition, for example, an expected charging time of the vehicle 'B' may be 40 minutes, an estimated time of arrival of the vehicle 'B' may be 12:40, and an expected charging end time of the vehicle 'B' may be 13:20.

In addition, for example, a vehicle '0' may be currently traveling to the second charging station 1420. In addition, for example, an expected charging time of the vehicle '0' may be 50 minutes, an estimated time of arrival of the vehicle '0' may be 13:20, and an expected charging end time of the vehicle '0' may be 14:10. In addition, for example, an estimated time of arrival of the vehicle 'P' 1400 to the second charging station 1420 may be 50 minutes.

In addition, for example, a daily average charging time of the third charging station 1430 may be 30 minutes, and a vehicle 'C' may be currently traveling to the third charging station 1430. In addition, for example, an expected charging time of the vehicle 'C' may be 40 minutes, an estimated time of arrival of the vehicle 'C' may be 13:20, and an expected charging end time of the vehicle 'C' may be 14:00. In addition, for example, an estimated time of arrival of the vehicle 'P' 1400 to the third charging station 1430 may be 90 minutes.

In the above embodiment, the charging station recommendation device may recommend the third charging station 1430 where the vehicle 'P' 1400 may start the charging without waiting to the vehicle 'P' 1400 among the first charging station 1410, the second charging station 1420, and the third charging station 1430. To this end, the charging station recommendation device may generate processing information including the third charging station 1430, and generate a charging station list including the third charging station 1430 using the processing information.

Figure 15:
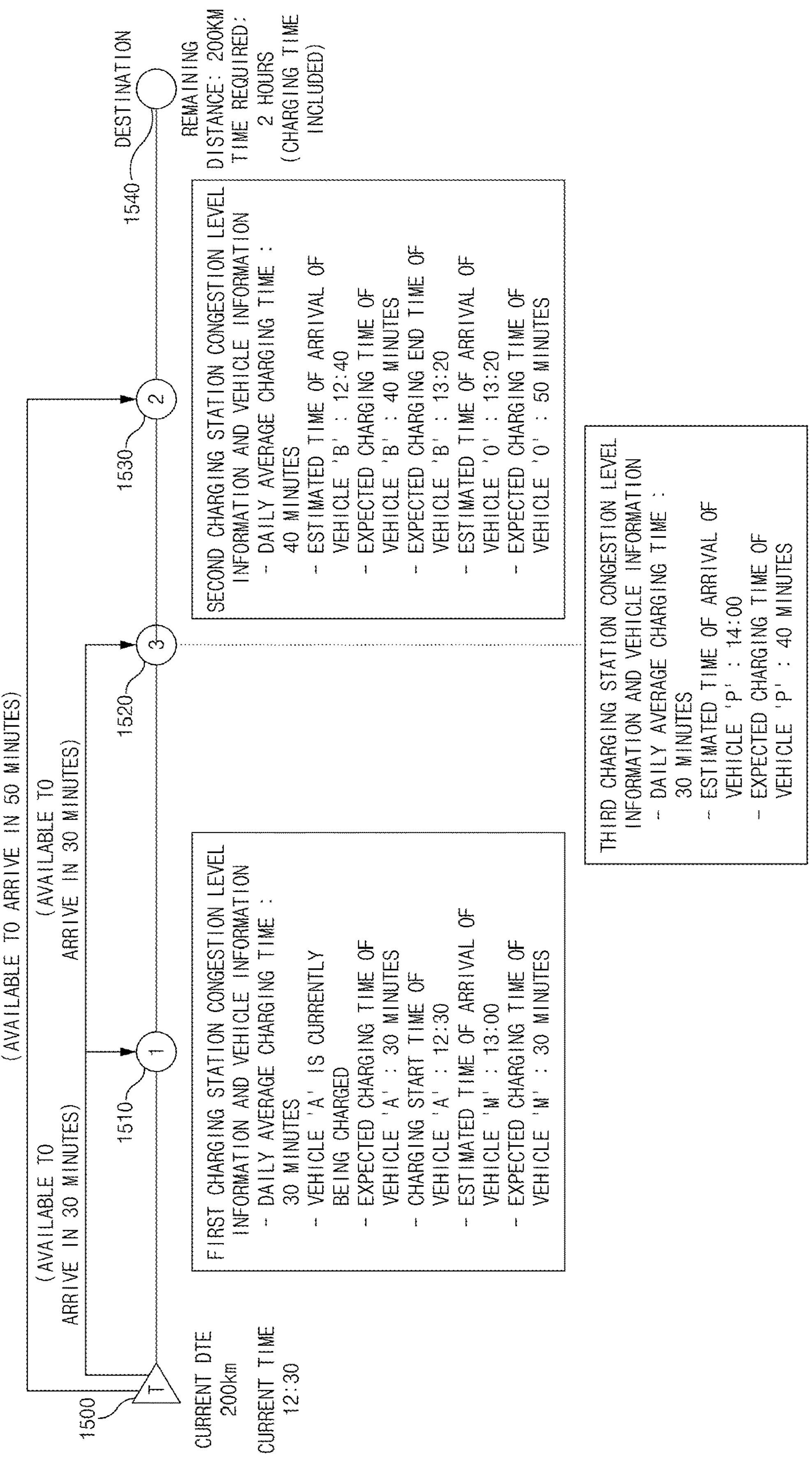
FIG. 15 is a conceptual diagram related to an operation in which a charging station recommendation device according to an embodiment of the present disclosure recommends a charging station using congestion level information for each charging station and real-time information of a vehicle.

FIG. 15 is a conceptual diagram related to an operation in which a charging station recommendation device according to an embodiment of the present disclosure recommends a charging station using congestion level information for each charging station and real-time information of a vehicle.

Referring to FIG. 15, in the device and the method for recommending the charging station according to one embodiment, the charging station recommendation device may determine whether a destination 1540 is reachable corresponding to the destination 1540 of the ego vehicle (e.g., a vehicle 'I' 1500) being set. For example, the charging station recommendation device may determine whether the destination 1540 is reachable based on the data of the ego vehicle 1500 and the real-time information related to the external environmental factors. For example, the data of the ego vehicle may include at least one of the location information of the ego vehicle, the state of charge of the battery, the distance to empty (DTE), or any combination thereof. For example, the real-time information related to the external environmental factors may include at least one of an outside air temperature, an outside air speed, and a weather near the vehicle 'I' 1500, an outside air temperature, an outside air speed, and a weather of a route to the destination, or any combination thereof.

According to one embodiment, the charging station recommendation device may recommend the optimal charging station to the vehicle 'I' 1500 based on the data of the vehicle and the current time when it is determined that the destination 1540 is not reachable corresponding to the destination 1540 of the vehicle 'I' 1500 being set.

According to one embodiment, when the distance to empty of the ego vehicle is equal to or lower than a remaining distance to the destination 1540, the charging station recommendation device may determine that the destination 1540 is not reachable.

For example, the remaining distance from a current location of the vehicle 'T' 1500 to the set destination 1540 may be 200 km, and a time required for arrival may be 2 hours. In addition, for example, a distance to empty of the vehicle 'T' 1500 may be 200 km, and a destination search request time may be 12:30. In this case, the charging station recommendation device may determine that the vehicle 'T' 1500 is not able to reach the destination 1540.

According to one embodiment, the charging station recommendation device may recommend the optimal charging station to the vehicle 'T' 1500 based on the expected congestion levels of the plurality of charging stations. For example, the charging station recommendation device may calculate the expected congestion level of each of the plurality of charging stations based on the real-time information of the plurality of charging stations and the real-time information of the at least one vehicle, generate the processing information including the optimal charging station based on the calculated expected congestion level, and generate the charging station list for recommending charging stations to the vehicle 'I' 1500 using the processing information. For example, the real-time information of the plurality of charging stations may include at least one of the location information, the type of the charger, the nearby amenity information, the charging fee information, the operating hours, the information on the vehicle being charged, the information on the vehicle scheduled to be charged, the daily average charging time information, or a combination thereof. For example, the real-time information of the at least one vehicle may include at least one of the estimated time of arrival to the charging station, the expected charging end time, the expected time required for the charging, or a combination thereof.

According to one embodiment, real-time information of a first charging station 1510, a second charging station 1520, and a third charging station 1530 and the vehicle information may include at least one of a daily average charging time, an expected charging time, and a charging start time or an expected charging end time.

For example, a daily average charging time of the first charging station 1510 may be 30 minutes, and the vehicle 'A' may be currently being charged at the first charging station 1510. In addition, for example, the expected charging time of the vehicle 'A' may be 30 minutes, the charging start time of the vehicle 'A' may be 12:30, and the expected charging end time of the vehicle 'A' may be 13:00.

In addition, for example, the vehicle 'M' may be currently traveling to the first charging station 1510. In addition, for example, the expected charging time of the vehicle 'M' may be 30 minutes, the estimated time of arrival of the vehicle 'M' may be 13:00, and the expected charging end time of the vehicle 'M' may be 13:30. In addition, for example, an estimated time of arrival to the first charging station 1510 of the vehicle 'T' 1500 may be 30 minutes.

In addition, for example, a daily average charging time of the second charging station 1520 may be 40 minutes, and the vehicle 'B' may be currently traveling to the second charging station 1520. In addition, for example, the expected charging time of the vehicle 'B' may be 40 minutes, the estimated time of arrival of the vehicle 'B' may be 12:40, and the expected charging end time of the vehicle 'B' may be 13:20.

In addition, for example, the vehicle '0' may be currently traveling to the second charging station 1520. In addition, for example, the expected charging time of the vehicle '0' may be 50 minutes, the estimated time of arrival of the vehicle '0' may be 13:20, and the expected charging end time of the vehicle '0' may be 14:10. In addition, for example, an estimated time of arrival of the vehicle 'T' 1500 to the second charging station 1520 may be 50 minutes.

In addition, for example, a daily average charging time of the third charging station 1530 may be 30 minutes, and the vehicle 'P' may be currently traveling to the third charging station 1530. In addition, for example, an expected charging time of the vehicle 'P' may be 40 minutes, an estimated time of arrival of the vehicle 'P' may be 14:00, and an expected charging end time of the vehicle 'P' may be 14:40. In addition, for example, an estimated time of arrival of the vehicle 'T' 1500 to the third charging station 1530 may be 30 minutes.

According to one embodiment, when there is no other vehicle being charged in the charging station or there is no other vehicle arriving at the charging station before the ego vehicle arrives at the charging station based on the destination search request time, the charging station recommendation device may determine the optimal charging station based on the daily average charging time information for each charging station.

For example, because there is no vehicle being charged in the third charging station 1530 and no other vehicle arrives at the third charging station 1530 until the arrival of the vehicle 'I' 1500, the charging station recommendation device may determine the optimal charging station based on the daily average charging time information of the third charging station 1530.

In the above embodiment, the charging station recommendation device may recommend the third charging station 1530 where the vehicle 'T' 1500 may start the charging without waiting to the vehicle 'T' 1500 among the first charging station 1510, the second charging station 1520, and the third charging station 1530.

Figure 16:
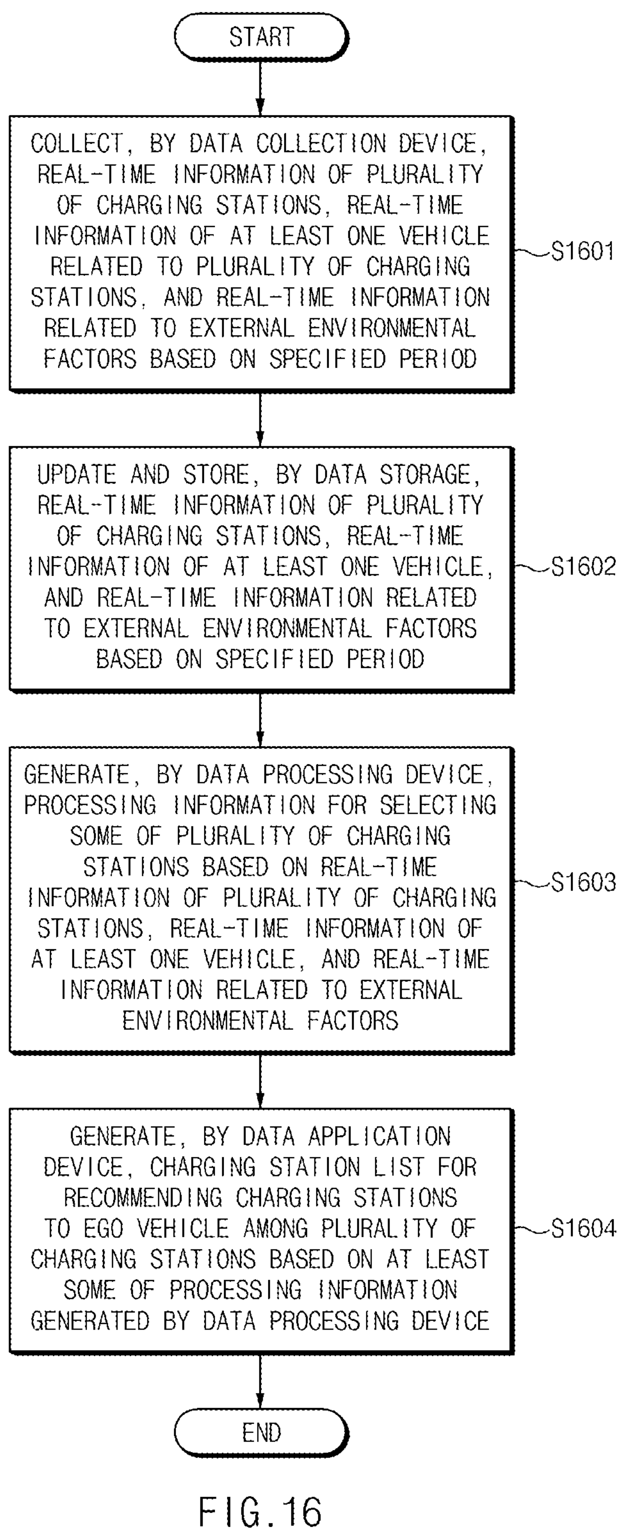
FIG. 16 shows a flowchart of operations of a charging station recommendation device according to an embodiment of the present disclosure.

Hereinafter, the charging station recommendation method according to an embodiment of the present disclosure will be described in detail with reference to FIG. 16. FIG. 16 shows a flowchart of operations of a charging station recommendation device according to an embodiment of the present disclosure.

Hereinafter, it is assumed that the charging station recommendation device 101 in FIG. 1 performs processes in FIG. 16. In addition, in a description of FIG. 16, it may be understood that an operation described as being performed by the device is controlled by the components of the charging station recommendation device 101.

In a following embodiment, operations of S1601 to S1604 may be sequentially performed, but are not necessarily sequentially performed. For example, an order of each operation may be changed, or at least two operations may be performed in parallel with each other. In addition, contents corresponding to or duplicated with the contents described above with respect to FIG. 16 may be briefly described or omitted.

Referring to FIG. 16, in the device (e.g., the charging station recommendation device 101 in FIG. 1) and the method for recommending the charging station according to one embodiment, the data collection device may collect the real-time information of the plurality of charging stations, the real-time information of the at least one vehicle related to the plurality of charging stations, and the real-time information related to the external environmental factors based on the specified period (S1601).

According to one embodiment, the data collection device may collect the real-time information of the plurality of charging stations.

According to one embodiment, the data collection device may receive the information of the charging station from one or more charging stations in real time via a wired or wireless network.

According to one embodiment, the data collection device may collect the real-time information of the at least one vehicle related to each of the plurality of charging stations. For example, the at least one vehicle related to the plurality of charging stations may include at least one of the vehicle being charged in the at least one charging station among the plurality of charging stations or the vehicle traveling to the at least one charging station among the plurality of charging stations. The data collection device may receive the information of the at least one vehicle related to the at least one charging station in real time via the wired/wireless network, for example.

According to one embodiment, in the device and the method for recommending the charging station, the data storage device may update and store the real-time information of the plurality of charging stations, the real-time information of the at least one vehicle, and the real-time information related to the external environmental factors based on the specified period (S1602).

According to one embodiment, the data storage device may update the information stored in advance based on the specified period. For example, the data storage device may update the charging information of the at least one charging station generated based on the real-time information of the plurality of charging stations and the real-time information of the at least one vehicle based on the specified period, and then store the updated information.

For example, the real-time information of the plurality of charging stations may include at least one of the location information, the type of the charger, the nearby amenity information, the charging fee information, the operating hours, the information on the vehicle being charged, the information on the vehicle scheduled to be charged, the daily average charging time information, the weather near the charging station, the charging station installation type (e.g., indoor or outdoor), or any combination thereof.

For example, the real-time information of the at least one vehicle may include at least one of the estimated time of arrival to the charging station, the expected charging end time, the expected time required for the charging, or any combination thereof.

For example, the real-time information related to the external environmental factors may include at least one of the outside air temperature, the outside air speed, weather, or any combination thereof. For example, at least one of the charging station preference of the driver, the charging fee, the parking fee, the real-time information of the plurality of charging stations, or any combination thereof may be included.

In addition, for example, the real-time information of the vehicle may include at least one of the location information of the vehicle, the remaining battery power, the distance to empty, the estimated time to run out of the battery, the battery charging scheme, the current travel destination information, or the current travel route.

According to one embodiment, in the device and the method for recommending the charging station, the data processing device may generate the processing information for selecting some of the plurality of charging stations based on the real-time information of the plurality of charging stations, the real-time information of the at least one vehicle, and the real-time information related to the external environmental factors (S1603).

According to one embodiment, the data processing device may generate the processing information used for generating the charging station list for recommending the charging stations to the ego vehicle based on at least one of the outside air temperature, the outside air speed, the weather, or any combination thereof.

According to one embodiment, the data processing device may select the at least one charging station to be included in the charging station list among the plurality of charging stations based on the outside air temperature, the outside air speed, and the weather. For example, the data processing device may generate the processing information including the at least one selected charging station.

According to one embodiment, in the device and the method for recommending the charging station, the data application device may generate the charging station list for recommending the charging stations to the ego vehicle among the plurality of charging stations based on at least some of the processing information generated by the data processing device (S1604).

According to one embodiment, the data application device may provide the charging station list to the ego vehicle only when the specified condition is satisfied. For example, upon determining that the ego vehicle is not able to reach the destination based on the data of the ego vehicle and the real-time information related to the external environmental factors, the data application device may provide the ego vehicle with the charging station list including the at least one optimal charging station. For example, the data of the ego vehicle may include at least one of the location information of the ego vehicle, the state of charge of the battery, the distance to empty, or any combination thereof.

Figure 17:
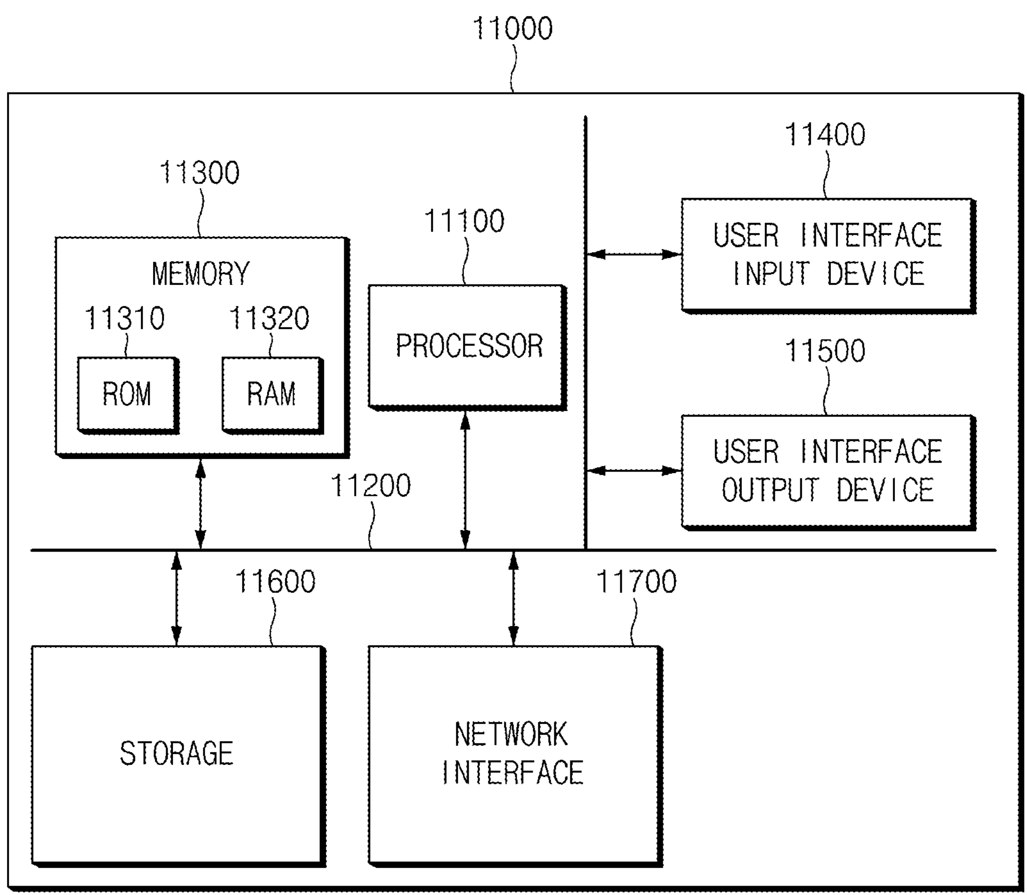
FIG. 17 shows a computing system related to a device and a method for recommending a charging station according to an embodiment of the present disclosure.

FIG. 17 shows a computing system related to a device and a method for recommending a charging station according to an embodiment of the present disclosure.

With reference to FIG. 17, a computing system 11000 related to the device and the method for recommending the charging station may include at least one processor 11100, a memory 11300, a user interface input device 11400, a user interface output device 11500, storage 11600, and a network interface 11700 connected via a bus 11200.

The processor 11100 may be a central processing unit (CPU) or a semiconductor device that performs processing on commands stored in the memory 11300 and/or the storage 11600. The memory 11300 and the storage 11600 may include various types of volatile or non-volatile storage media. For example, the memory 11300 may include a ROM (Read Only Memory) 11310 and a RAM (Random Access Memory) 11320.

Thus, the operations of the method or the algorithm described in connection with the embodiments disclosed herein may be embodied directly in hardware or a software module executed by the processor 11100, or in a combination thereof. The software module may reside on a storage medium (that is, the memory 11300 and/or the storage 11600) such as a RAM, a flash memory, a ROM, an EPROM, an EEPROM, a register, a hard disk, a removable disk, and a CD-ROM.

The exemplary storage medium is coupled to the processor 11100, which may read information from, and write information to, the storage medium. In another method, the storage medium may be integral with the processor 11100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

Effects of the device and the method for recommending the charging station according to the present disclosure will be described as follows.

According to at least one of the embodiments of the present disclosure, the optimal charging station considering the battery state or the hydrogen storage tank state may be recommended in real time using at least one of the temperature, the wind speed, the weather, or any combination thereof for selecting the charging station to be recommended.

In addition, according to at least one of the embodiments of the present disclosure, a customized charging station recommendation service may be provided to the user by selectively recommending the indoor charging station or the outdoor charging station based on the external factors.

In addition, according to at least one of the embodiments of the present disclosure, as the charging station is recommended in consideration of the influence of the external factors on the battery or the hydrogen storage tank, the charging station recommendation service may be provided while consistently maintaining optimal efficiency regarding battery use or hydrogen storage tank use.

In addition, according to at least one of the embodiments of the present disclosure, user convenience may be increased by making the charging station immediately available using estimated arrival information of the vehicle for each charging station.

In addition, according to at least one of the embodiments of the present disclosure, an efficient charging station recommendation function may be provided by recommending the charging station using the congestion level information for each charging station.

In addition, various effects identified directly or indirectly through this document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for recommending a charging station, the device comprising:

a data collection device for collecting real-time information of a plurality of charging stations, real-time information of at least one vehicle related to the plurality of charging stations, and real-time information related to external environmental factors based on a specified period;

a data storage device for updating and storing the real-time information of the plurality of charging stations, the real-time information of the at least one vehicle, and the real-time information related to the external environmental factors based on the specified period;

a data processing device for generating processing information for selecting some of the plurality of charging stations based on the real-time information of the plurality of charging stations, the real-time information of the at least one vehicle, and the real-time information related to the external environmental factors; and a data application device for generating a charging station list for recommending charging stations among the plurality of charging stations to an ego vehicle based on at least some of the processing information generated by the data processing device, wherein the data processing device is configured to:

identify at least one of an outside air temperature or an outside air speed of a region including a travel route of the ego vehicle among the real-time information related to the external environmental factors, classify the region into a plurality of temperature regions based on the outside air temperature, or into a plurality of wind speed regions based on the outside air speed, identify a charging station of an indoor type among the plurality of charging stations based on at least one of (i) a temperature region in which the outside air temperature is lower than a predetermined temperature, or (ii) a wind speed region in which the outside air speed is equal to or higher than a predetermined speed, and generate the processing information including the identified charging station of the indoor type.

2. The device of claim 1, wherein the data processing device is configured to:

classify the region into the plurality of temperature regions including a first temperature region, a second temperature region, and a third temperature region based on the outside air temperature, wherein the first temperature region includes a region where the outside air temperature is equal to or higher than a first temperature, wherein the second temperature region includes a region where the outside air temperature is lower than the first temperature and equal to or higher than a second temperature lower than the first temperature, wherein the third temperature region includes a region where the outside air temperature is lower than the second temperature.

3. The device of claim 2, wherein the data processing device is further configured to:

identify at least one charging station included in the third temperature region among the plurality of charging stations;

identify the charging station of the indoor type among the at least one charging station based on the real-time information of the plurality of charging stations; and generate the processing information including the identified charging station of the indoor type.

4. The device of claim 2, wherein the data processing device is further configured to:

classify the region into the plurality of wind speed regions including a first wind speed region, a second wind speed region, and a third wind speed region based on the outside air speed, wherein the first wind speed region includes a region where the outside air speed is lower than a first speed, wherein the second wind speed region includes a region where the outside air speed is equal to or higher than the first speed and lower than a second speed higher than the first speed, wherein the third wind speed region includes a region where the outside air speed is equal to or higher than the second speed.

5. The device of claim 4, wherein the data processing device is further configured to:

identify at least one first charging station included in the third wind speed region among the plurality of charging stations;

identify at least one second charging station included in the first wind speed region and the third temperature region among the plurality of charging stations;

identify at least one third charging station included in the second wind speed region and the second temperature region among the plurality of charging stations;

identify the charging station of the indoor type among the at least one first charging station, the at least one second charging station, and the at least one third charging station based on the real-time information of the plurality of charging stations; and generate the processing information including the identified charging station of the indoor type.

6. The device of claim 5, wherein the data processing device is further configured to:

identify remaining charging stations other than the at least one first charging station, the at least one second charging station, and the at least one third charging station among the plurality of charging stations;

identify at least one fourth charging station among the remaining charging stations based on at least one of a charging station preference of a driver, a charging fee, a parking fee, the real-time information of the plurality of charging stations, or any combination thereof; and generate the processing information further including the at least one fourth charging station.

7. The device of claim 1, wherein the data processing device is configured to:

classify the plurality of charging stations into charging stations of a first group and charging stations of a second group based on a weather near the charging station and a charging station installation type included in the real-time information of the plurality of charging stations;

generate recommendation information for assigning a higher weight to the charging stations of the first group than to the charging stations of the second group; and generate the processing information for generating the charging station list further based on the recommendation information.

8. The device of claim 7, wherein the data processing device is further configured to:

classify charging stations with the weather near the charging station corresponding to a first weather including snow, rain, hail, and typhoon and with the charging station installation type being an outdoor type as the charging stations of the second group among the plurality of charging stations; and classify remaining charging stations not classified as the charging stations of the second group as the charging stations of the first group among the plurality of charging stations.

9. The device of claim 1, wherein the data application device is configured to:

determine, when a destination of the ego vehicle is set, whether the destination is reachable based on data of the ego vehicle and the real-time information related to the external environmental factors; and provide the charging station list including at least one optimal charging station to the ego vehicle upon determining that the destination is not reachable, wherein the data of the ego vehicle includes at least one of location information of the ego vehicle, a state of charge (SoC) of a battery, a distance to empty (DTE), a state of charge of a hydrogen storage tank, an estimated distance for the hydrogen storage tank to empty, or any combination thereof.

10. The device of claim 1, wherein the data processing device is configured to:

calculate expected congestion levels of the plurality of charging stations using the real-time information of the plurality of charging stations and the real-time information of the at least one vehicle related to the plurality of charging stations; and generate the processing information further based on the expected congestion levels, wherein the real-time information of the plurality of charging stations includes at least one of location information, a type of a charger, nearby amenity information, charging fee information, operating hours, information on a vehicle being charged, information on a vehicle scheduled to be charged, daily average charging time information, or any combination thereof, wherein the real-time information of the at least one vehicle includes at least one of an estimated time of arrival to a charging station, an expected charging end time, an expected time required for charging, or any combination thereof.

11. A method for recommending a charging station, the method comprising:

collecting, by a data collection device, real-time information of a plurality of charging stations, real-time information of at least one vehicle related to the plurality of charging stations, and real-time information related to external environmental factors based on a specified period;

updating and storing, by a data storage device, the real-time information of the plurality of charging stations, the real-time information of the at least one vehicle, and the real-time information related to the external environmental factors based on the specified period;

generating, by a data processing device, processing information for selecting some of the plurality of charging stations based on the real-time information of the plurality of charging stations, the real-time information of the at least one vehicle, and the real-time information related to the external environmental factors; and generating, by a data application device, a charging station list for recommending charging stations among the plurality of charging stations to an ego vehicle based on at least some of the processing information generated by the data processing device, wherein the generating by the data processing device of the processing information includes:

identifying, by the data processing device, at least one of an outside air temperature or an outside air speed of a region including a travel route of the ego vehicle among the real-time information related to the external environmental factors;

classifying, by the data processing device, the region into a plurality of temperature regions based on the outside air temperature, or into a plurality of wind speed regions based on the outside air speed;

identifying, by the data processing device, a charging station of an indoor type among the plurality of charging stations based on at least one of (i) a temperature region in which the outside air temperature is lower than a predetermined temperature, or (ii) a wind speed region in which the outside air speed is equal to or higher than a predetermined speed; and generating, by the data processing device, the processing information including the identified charging station of the indoor type.

12. The method of claim 11, wherein the generating, by the data processing device, of the processing information includes:

classifying, by the data processing device, the region into the plurality of temperature regions including a first temperature region, a second temperature region, and a third temperature region based on the outside air temperature, wherein the first temperature region includes a region where the outside air temperature is equal to or higher than a first temperature, wherein the second temperature region includes a region where the outside air temperature is lower than the first temperature and equal to or higher than a second temperature lower than the first temperature, wherein the third temperature region includes a region where the outside air temperature is lower than the second temperature.

13. The method of claim 12, wherein the generating, by the data processing device, of the processing information further includes:

identifying, by the data processing device, at least one charging station included in the third temperature region among the plurality of charging stations;

identifying, by the data processing device, the charging station of the indoor type among the at least one charging station based on the real-time information of the plurality of charging stations; and generating, by the data processing device, the processing information including the identified charging station of the indoor type.

14. The method of claim 12, wherein the generating, by the data processing device, of the processing information further includes:

classifying, by the data processing device, the region into the plurality of wind speed regions including a first wind speed region, a second wind speed region, and a third wind speed region based on the outside air speed, wherein the first wind speed region includes a region where the outside air speed is lower than a first speed, wherein the second wind speed region includes a region where the outside air speed is equal to or higher than the first speed and lower than a second speed higher than the first speed, wherein the third wind speed region includes a region where the outside air speed is equal to or higher than the second speed.

15. The method of claim 14, wherein the generating, by the data processing device, of the processing information further includes:

identifying, by the data processing device, at least one first charging station included in the third wind speed region among the plurality of charging stations;

identifying, by the data processing device, at least one second charging station included in the first wind speed region and the third temperature region among the plurality of charging stations;

identifying, by the data processing device, at least one third charging station included in the second wind speed region and the second temperature region among the plurality of charging stations;

identifying, by the data processing device, the charging station of the indoor type among the at least one first charging station, the at least one second charging station, and the at least one third charging station based on the real-time information of the plurality of charging stations; and generating, by the data processing device, the processing information including the identified charging station of the indoor type.

16. The method of claim 15, wherein the generating, by the data processing device, of the processing information further includes:

identifying, by the data processing device, remaining charging stations other than the at least one first charging station, the at least one second charging station, and the at least one third charging station among the plurality of charging stations;

identifying, by the data processing device, at least one fourth charging station among the remaining charging stations based on at least one of a charging station preference of a driver, a charging fee, a parking fee, the real-time information of the plurality of charging stations, or any combination thereof; and generating, by the data processing device, the processing information further including the at least one fourth charging station.

17. The method of claim 11, wherein the generating, by the data processing device, of the processing information includes:

classifying, by the data processing device, the plurality of charging stations into charging stations of a first group and charging stations of a second group based on a weather near the charging station and a charging station installation type included in the real-time information of the plurality of charging stations;

generating, by the data processing device, recommendation information for assigning a higher weight to the charging stations of the first group than to the charging stations of the second group; and generating, by the data processing device, the processing information for generating the charging station list further based on the recommendation information.

18. The method of claim 17, wherein the generating, by the data processing device, of the processing information further includes:

classifying, by the data processing device, charging stations with the weather near the charging station corresponding to a first weather including snow, rain, hail, and typhoon and with the charging station installation type being an outdoor type as the charging stations of the second group among the plurality of charging stations; and classifying, by the data processing device, remaining charging stations not classified as the charging stations of the second group as the charging stations of the first group among the plurality of charging stations.

19. The method of claim 11, wherein the generating, by the data application device, of the charging station list includes:

determining, by the data application device, when a destination of the ego vehicle is set, whether the destination is reachable based on data of the ego vehicle and the real-time information related to the external environmental factors; and providing, by the data application device, the charging station list including at least one optimal charging station to the ego vehicle upon determining that the destination is not reachable, wherein the data of the ego vehicle includes at least one of location information of the ego vehicle, a state of charge (SoC) of a battery, a distance to empty (DTE), a state of charge of a hydrogen storage tank, an estimated distance for the hydrogen storage tank to empty, or any combination thereof.

20. The method of claim 19, wherein the generating, by the data processing device, of the processing information further includes:

calculating, by the data processing device, expected congestion levels of the plurality of charging stations using the real-time information of the plurality of charging stations and the real-time information of the at least one vehicle related to the plurality of charging stations; and generating, by the data processing device, the processing information further based on the expected congestion levels, wherein the real-time information of the plurality of charging stations includes at least one of location information, a type of a charger, nearby amenity information, charging fee information, operating hours, information on a vehicle being charged, information on a vehicle scheduled to be charged, daily average charging time information, or any combination thereof, wherein the real-time information of the at least one vehicle includes at least one of an estimated time of arrival to a charging station, an expected charging end time, an expected time required for charging, or any combination thereof.

* * * * *